(12) United States Patent
Zheng et al.

(10) Patent No.: US 11,368,714 B2
(45) Date of Patent: *Jun. 21, 2022

(54) METHOD AND DEVICE FOR VIDEO IMAGE PROCESSING

(71) Applicant: SZ DJI TECHNOLOGY CO., LTD., Shenzhen (CN)

(72) Inventors: Xiaozhen Zheng, Shenzhen (CN); Tianliang Fu, Beijing (CN); Shanshe Wang, Beijing (CN); Siwei Ma, Beijing (CN); Weiran Li, Shenzhen (CN); Suhong Wang, Beijing (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/039,939

(22) Filed: Sep. 30, 2020

(65) Prior Publication Data

US 2021/0021825 A1     Jan. 21, 2021

Related U.S. Application Data

(63) Continuation of application No. PCT/CN2018/112805, filed on Oct. 30, 2018.

(30) Foreign Application Priority Data

Apr. 2, 2018    (WO) ................ PCT/CN2018/081652
Jul. 13, 2018    (WO) ................ PCT/CN2018/095710
(Continued)

(51) Int. Cl.
    *H04N 19/58*     (2014.01)
    *H04N 19/129*    (2014.01)
(Continued)

(52) U.S. Cl.
    CPC ........... *H04N 19/58* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS 8,798,156 B2    8/2014   Jeon
9,497,481 B2    11/2016   Kitahara et al.
(Continued)

FOREIGN PATENT DOCUMENTS

CN     101573985 A    11/2009
CN     101873500 A    10/2010
(Continued)

OTHER PUBLICATIONS

The World Intellectual Property Organization (WIPO) International Search Report for PCT/CN2019/078051 dated May 22, 2019 4 Pages (including translation).

(Continued)

*Primary Examiner* — Christopher G Findley
(74) *Attorney, Agent, or Firm* — Anova Law Group, PLLC

(57) ABSTRACT

A video image processing method includes dividing a coding unit into one or more sub-block, constructing first and second motion vector candidate lists, and performing prediction for the coding unit according to the first and second motion vector candidate lists. The first motion vector candidate list includes a motion vector of a sub-block of the coding unit, and the second motion vector candidate list includes a motion vector of the coding unit. Constructing the first motion vector candidate list includes determining a reference motion vector of the coding unit, determining a (Continued)

related reference block of the sub-block of the coding unit in a co-located reference image of the coding unit according to the reference motion vector, determining a scaling factor of the motion vector of the related reference block, adding the scaled motion vector into the first motion vector candidate list.

5 Claims, 9 Drawing Sheets

(30) Foreign Application Priority Data

Aug. 31, 2018 (WO) ................ PCT/CN2018/103693
Sep. 25, 2018 (WO) ................ PCT/CN2018/107436

(51) Int. Cl.
| | |
|---|---|
| *H04N 19/139* | (2014.01) |
| *H04N 19/176* | (2014.01) |
| *H04N 19/105* | (2014.01) |
| *H04N 19/119* | (2014.01) |
| *H04N 19/30* | (2014.01) |
| *H04N 19/137* | (2014.01) |
| *H04N 19/513* | (2014.01) |
| *H04N 19/56* | (2014.01) |
| *H04N 19/96* | (2014.01) |
| *H04N 19/573* | (2014.01) |

(52) U.S. Cl.
CPC ......... *H04N 19/129* (2014.11); *H04N 19/137* (2014.11); *H04N 19/139* (2014.11); *H04N 19/176* (2014.11); *H04N 19/30* (2014.11); *H04N 19/513* (2014.11); *H04N 19/56* (2014.11); *H04N 19/573* (2014.11); *H04N 19/96* (2014.11)

(56) References Cited

U.S. PATENT DOCUMENTS

| | | | |
|---|---|---|---|
| 2005/0013498 A1 | 1/2005 | Srinivasan et al. | |
| 2006/0269153 A1 | 11/2006 | Shi et al. | |
| 2012/0128060 A1* | 5/2012 | Lin .................... | H04N 19/573 375/240.02 |
| 2012/0128071 A1 | 5/2012 | Celetto et al. | |
| 2012/0269270 A1 | 10/2012 | Chen et al. | |
| 2012/0320981 A1 | 12/2012 | Shimada et al. | |
| 2013/0107963 A1* | 5/2013 | Wahadaniah .......... | H04N 19/52 375/240.16 |
| 2013/0107964 A1 | 5/2013 | Wahadaniah et al. | |
| 2013/0107965 A1 | 5/2013 | Wahadaniah et al. | |
| 2013/0114742 A1 | 5/2013 | Hannuksela et al. | |
| 2014/0016701 A1 | 1/2014 | Chen et al. | |
| 2014/0098876 A1 | 4/2014 | Jeon | |
| 2014/0153641 A1 | 6/2014 | Kim et al. | |
| 2014/0169475 A1 | 6/2014 | Zhang et al. | |
| 2014/0233651 A1* | 8/2014 | Nakamura ............. | H04N 19/51 375/240.16 |
| 2014/0307783 A1* | 10/2014 | Kim .................... | H04N 19/513 375/240.03 |
| 2014/0314147 A1 | 10/2014 | Rusanovskyy et al. | |
| 2014/0376638 A1* | 12/2014 | Nakamura ........... | H04N 19/197 375/240.16 |
| 2015/0085929 A1 | 3/2015 | Chen et al. | |
| 2015/0195558 A1 | 7/2015 | Kim | |
| 2016/0330472 A1 | 11/2016 | Han et al. | |
| 2017/0289566 A1* | 10/2017 | He ..................... | H04N 19/52 |
| 2017/0332099 A1* | 11/2017 | Lee .................... | H04N 19/122 |
| 2017/0347128 A1 | 11/2017 | Panusopone et al. | |
| 2018/0052986 A1 | 2/2018 | Stolbikov et al. | |
| 2018/0199055 A1 | 7/2018 | Sun et al. | |
| 2018/0199057 A1 | 7/2018 | Chuang et al. | |
| 2018/0316918 A1 | 11/2018 | Drugeon et al. | |
| 2019/0182504 A1 | 6/2019 | Lainema | |
| 2019/0342557 A1 | 11/2019 | Robert et al. | |
| 2020/0029092 A1 | 1/2020 | Rath et al. | |
| 2020/0053361 A1 | 2/2020 | Robert et al. | |
| 2020/0120344 A1* | 4/2020 | Mao ..................... | H04N 19/159 |
| 2020/0296414 A1 | 9/2020 | Park et al. | |
| 2021/0021818 A1 | 1/2021 | Lee et al. | |

FOREIGN PATENT DOCUMENTS

| | | |
|---|---|---|
| CN | 102447904 A | 5/2012 |
| CN | 103190151 A | 7/2013 |
| CN | 103299636 A | 9/2013 |
| CN | 103329537 A | 9/2013 |
| CN | 103636218 A | 3/2014 |
| CN | 103748879 A | 4/2014 |
| CN | 104488272 A | 4/2015 |
| CN | 104796724 A | 7/2015 |
| CN | 106375770 A | 2/2017 |
| CN | 106534858 A | 3/2017 |
| CN | 107071477 A | 8/2017 |
| CN | 107105281 A | 8/2017 |
| CN | 107534778 A | 1/2018 |
| CN | 107682705 A | 2/2018 |
| CN | 107820095 A | 3/2018 |
| EP | 2763416 A1 | 8/2014 |
| EP | 2863631 A1 | 4/2015 |
| EP | 3200461 A1 | 8/2017 |
| WO | 2017157281 A1 | 9/2017 |
| WO | 2018052986 A1 | 3/2018 |

OTHER PUBLICATIONS

The World Intellectual Property Organization (WIPO) International Search Report for PCT/CN2018/081652 dated Jan. 8, 2019 6 Pages (including translation).
The World Intellectual Property Organization (WIPO) International Search Report for PCT/CN2018/095710 dated Dec. 29, 2018 8 Pages (including translation).
The World Intellectual Property Organization (WIPO) International Search Report for PCT/CN2018/103693 dated May 31, 2019 6 Pages (including translation).
The World Intellectual Property Organization (WIPO) International Search Report for PCT/CN2018/107436 dated Nov. 30, 2018 4 Pages (including translation).
The World Intellectual Property Organization (WIPO) International Search Report for PCT/CN2018/112805 dated Jan. 30, 2019 10 Pages (including translation).
Bernd Girod, Motion-Compensating Prediction with Fractional-Pel Accuracy, IEEE Transactions on Communications, Apr. 1993, pp. 604-612, vol. 41, No. 4.
Xiaoyu Xiu, et al., CE4.2.5: Simplifications on advanced temporal motion vector prediction (ATMVP), Joint Video Experts Team (JVET) of ITU-T SG 16 WP 3 and ISO/IEC JTC 1/SC 29/WG 11, Jul. 2018.
Hyeongmun Jang, et al., [CE4-2.6] Simplified ATMVP, Joint Video Experts Team (JVET) of ITU-T SG 16 WP 3 and ISO/IEC JTC 1/SC 29/WG 11, Jul. 2018.
Karsten Suehring, VVC reference software, VTM-2.0, Fraunhofer HHI, 2019. https://vegit.hhi.fraunhofer.de/jvet/VVCSoftware_VTM/-/tree/VTM-2.0.
Takahashi Y et al: "High-level Syntax: Motion vector prediction issue for long-term reference picture", 10. JCT-VC Meeting; 101. MPEG Meeting; Jul. 11, 2012-Jul. 20, 2012; No. JCTVC-J0071, Jun. 29, 2012.
Chen Fangdonget Al: "Block-Composed Background Reference for High Efficiency Video Coding", IEEE Transactions On Circuits and Systems for Video Technology, IEEE, USA, vol. 27, No. 12, Dec. 1, 2017, pp. 2639-2651.
Chen J et al: "Algorithm description of Joint Exploration Test Model 7 (JEM7)", No. G1001_v1; JVET-G1001, Aug. 19, 2017, pp. 1-48.

(56) References Cited

OTHER PUBLICATIONS

Seungsoo Jeong et al: "CE4 Ultimate motion vector expression in JVET-J0024 (Test 4.2.9)", No. JVET-K0115_v4; JVET-K0115, Jul. 12, 2018, pp. 1-7.
Alshin A et al: "Description of SDR, HDR and 360° video coding technology proposal by Samsung, Huawei, GoPro, and HiSilicon—mobile application scenario", No. m42354, Apr. 14, 2018.
"Algorithm description of Joint Exploration Test Model 7 (JEM7)", 119. MPEG Meeting, Torino; (Motion Picture Expert Group or ISO/IEC JTC1/SC29/WG11), No. n17055, Oct. 6, 2017.
Xiu X et al: "Description of SDR, HDR and 360° video coding technology proposal by InterDigital Communications and Dolby Laboratories", 10. JVET Meeting, No. JVET-J0015, Apr. 3, 2018.
Li (Panasonic) J et al: "AHG5: Reduction of worst case memory bandwidth", 124. MPEG Meeting, No. m44131, Oct. 5, 2018.

\* cited by examiner

METHOD AND DEVICE FOR VIDEO IMAGE PROCESSING

CROSS-REFERENCE TO RELATED APPLICATIONS

This application is a continuation of International Application No. PCT/CN2018/112805, filed Oct. 30, 2018, which claims priority to International Application No. PCT/CN2018/107436, filed Sep. 25, 2018, International Application No. PCT/CN2018/103693, filed Aug. 31, 2018, International Application No. PCT/CN2018/095710, filed Jul. 13, 2018, and International Application No. PCT/CN2018/081652, filed Apr. 2, 2018, the entire contents of all of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of video encoding and decoding, and in particular to a method and device for video image processing.

BACKGROUND

At present, the main video coding standards adopt block-based motion compensation technology in inter prediction. The main principle is to find the most similar block in an encoded image for a current image block. This process is called motion compensation. For example, an image is first divided into coding tree units (CTUs) of equal size, such as the size of 64×64 or 128×128. Each CTU can be further divided into square or rectangular coding units (CUs). For each CU, the most similar block is searched in a reference frame (generally a re-composite frame near a current frame in the time domain) as a prediction block of the current CU. A relative displacement between the current block (that is, the current CU) and the similar block (that is, the prediction block of the current CU) is referred to as a motion vector (MV). The process of finding the most similar block in the reference frame as the prediction block of the current block is motion compensation.

In the current technology, a motion vector candidate list of the current CU is usually constructed according to the motion vector of encoded neighboring blocks of the current CU, and the motion vector candidate list is also called a Merge candidate list. An optimal motion vector candidate is selected from the Merge candidate list as the motion vector of the current CU and a prediction block of the current CU is determined according to the motion vector of the current CU.

Advanced/alternative temporal motion vector prediction (ATMVP) is a motion vector prediction mechanism. The basic principle of ATMVP technology is to perform motion compensation by obtaining motion information of multiple sub-blocks in the current CU. ATMVP technology introduces motion information of multiple sub-blocks in the current CU as candidates in constructing a candidate list (such as a Merge candidate list or an advanced motion vector prediction (AMVP) candidate list). The ATMVP technology includes two steps. The first step is to determine a time-domain vector by scanning the motion vector candidate list of the current CU or the motion vector of the neighboring image block of the current CU, and the second step is to divide the current CU into N×N (by default, N is 4) sub-blocks (sub-CU), determine a corresponding block of each sub-block in the reference frame according to the obtained time-domain vector, and determine the motion vector of each sub-block according to the motion vector of the corresponding block of each sub-block in the reference frame.

In the first step of the current ATMVP technology, the process of determining a time-domain vector by scanning the candidate list of the current CU or the motion vector of the neighboring image block of the current CU can be improved.

SUMMARY

In accordance with the disclosure, there is provided a video image processing method including dividing a coding unit into one or more sub-blocks, constructing a first motion vector candidate list and a second motion vector candidate list, and performing prediction for the coding unit according to the first motion vector candidate list and the second motion vector candidate list. The first motion vector candidate list includes a motion vector of one of the one or more sub-blocks of the coding unit, and the second motion vector candidate list includes a motion vector of the coding unit. Constructing the first motion vector candidate list includes scanning a left neighboring block of the coding unit and, in response to a reference frame pointed to by a motion vector of the left neighboring block being same as a co-located reference image of the coding unit, determining the motion vector of the left neighboring block as a reference motion vector of the coding unit, and in response to the reference frame pointed to by the motion vector of the left neighboring block being different from the co-located reference image of the coding unit, determining a default value (0, 0) as the reference motion vector of the coding unit. Constructing the first motion vector candidate list further includes determining a related reference block of the one of the one or more sub-blocks of the coding unit in the co-located reference image of the coding unit according to the reference motion vector of the coding unit. Constructing the first motion vector candidate list also includes, in response to a motion vector of the related reference block of the one of the one or more sub-blocks pointing to a short-term reference image, determining a scaling factor of the motion vector of the related reference block of the one of the one or more sub-blocks according to a temporal distance between a reference image pointed to by the motion vector of the related reference block of the one of the one or more sub-blocks and the co-located reference image of the coding unit and a temporal distance between the co-located reference image of the coding unit and an image containing the coding unit, and scaling the motion vector of the related reference block of the one of the one or more sub-blocks using the scaling factor. Constructing the first motion vector candidate list also includes, in response to the motion vector of the related reference block of the one of the one or more sub-blocks pointing to a long-term reference image, setting the scaling factor of the motion vector of the related reference block of the one of the one or more sub-blocks to 1, and scaling the motion vector of the related reference block of the one of the one or more sub-blocks using the scaling factor. Constructing the first motion vector candidate list also includes adding the motion vector of the related reference block of the one of the one or more sub-blocks after being scaled into the first motion vector candidate list.

Also in accordance with the disclosure, there is provided a video image processing device including a memory storing computer executable instructions and a processor configured to execute the instructions to divide a coding unit into one or more sub-blocks, construct a first motion vector candidate list and a second motion vector candidate list, and perform prediction for the coding unit according to the first motion vector candidate list and the second motion vector candidate list. The first motion vector candidate list includes a motion vector of one of the one or more sub-blocks of the coding unit, and the second motion vector candidate list includes a motion vector of the coding unit. Constructing the first motion vector candidate list includes scanning a left neighboring block of the coding unit and, in response to a reference frame pointed to by a motion vector of the left neighboring block being same as a co-located reference image of the coding unit, determining the motion vector of the left neighboring block as a reference motion vector of the coding unit, and in response to the reference frame pointed to by the motion vector of the left neighboring block being different from the co-located reference image of the coding unit, determining a default value (0, 0) as the reference motion vector of the coding unit. Constructing the first motion vector candidate list further includes determining a related reference block of the one of the one or more sub-blocks of the coding unit in the co-located reference image of the coding unit according to the reference motion vector of the coding unit. Constructing the first motion vector candidate list also includes, in response to a motion vector of the related reference block of the one of the one or more sub-blocks pointing to a short-term reference image, determining a scaling factor of the motion vector of the related reference block of the one of the one or more sub-blocks according to a temporal distance between a reference image pointed to by the motion vector of the related reference block of the one of the one or more sub-blocks and the co-located reference image of the coding unit and a temporal distance between the co-located reference image of the coding unit and an image containing the coding unit, and scaling the motion vector of the related reference block of the one of the one or more sub-blocks using the scaling factor. Constructing the first motion vector candidate list also includes, in response to the motion vector of the related reference block of the one of the one or more sub-blocks pointing to a long-term reference image, setting the scaling factor of the motion vector of the related reference block of the one of the one or more sub-blocks to 1, and scaling the motion vector of the related reference block of the one of the one or more sub-blocks using the scaling factor. Constructing the first motion vector candidate list also includes adding the motion vector of the related reference block of the one of the one or more sub-blocks after being scaled into the first motion vector candidate list.

DETAILED DESCRIPTION OF THE EMBODIMENTS

Figure 1:
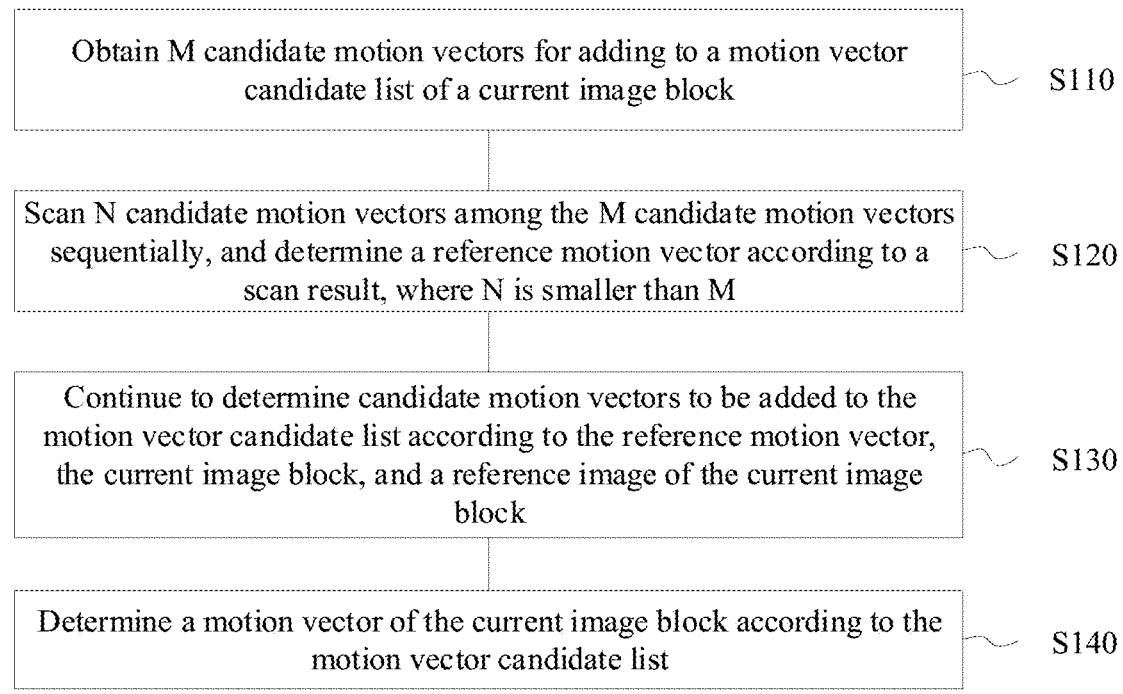
FIG. 1 is a schematic flowchart of a video image processing method according to an embodiment of the disclosure.

In video encoding and decoding, the prediction process is used to reduce redundant information in the image. A prediction block refers to a basic unit used for prediction in a frame of image. In some standards, the prediction block is also called a prediction unit (PU). Before a frame of image is encoded/compressed, the image is divided into multiple image blocks, and further, each image block of the multiple image blocks may be further divided into multiple image blocks, and so on. In different coding methods, the number of division levels can be different, and the operation methods can also be different. In different coding standards, the names of image blocks on the same level may be different. For example, in some video standards, each of the multiple image blocks that a frame of image is divided into for the first time is called a coding tree unit (CTU), a coding tree unit may include a coding unit (CU) or may be further divided into multiple coding units, and a coding unit may be divided into one, two, four or other numbers of prediction units according to the prediction mode. In some video standards, the coding tree unit is also referred to as a largest coding unit (LCU).

Prediction refers to finding image data similar to the prediction block, which is also called a reference block of the prediction block. By encoding/compressing the difference between the prediction block and the reference block of the prediction block, the redundant information in the encoding/compression is reduced. The difference between the prediction block and the reference block may be a residual obtained by subtracting a corresponding pixel value of the prediction block and the reference block. Prediction includes intra prediction and inter prediction. Intra prediction refers to searching the reference block of the prediction block in the frame where the prediction block is located, and inter prediction refers to searching the reference block of the prediction block in other frames except the frame where the prediction block is located.

In some video standards, the prediction unit is the smallest unit in an image, and the prediction unit is not further divided into multiple image blocks. An "image block" or a "current image block" mentioned below refers to a prediction unit (or a coding unit), and an image block can be further divided into multiple sub-blocks, and each sub-block can be further used for prediction.

In this disclosure, before a prediction is performed on the current image block, a motion vector candidate list is constructed, and the prediction is performed on the current image block based on the candidate motion vector selected from the motion vector candidate list. The motion vector candidate list has multiple types of modes. The multiple types of modes of the motion vector candidate list are described as follows.

In the first type of mode, for example, at the encoding end, after the motion vector candidate list is constructed, the current image block may be encoded by the following processes.

1) Select an optimal motion vector (denoted as MV1) from the motion vector candidate list, use the selected MV1 as the motion vector of the current image block, and obtain an index of the MV1 in the motion vector candidate list.

2) Determine a predicted image block of the current image block from the reference image (i.e., reference frame) according to the motion vector MV1 of the current image block. That is, a position of the predicted image block of the current image block in the reference frame is determined.

3) Obtain a residual between the current image block and the predicted image block.

4) Send the index of the motion vector MV1 of the current image block in the motion vector candidate list and the obtained residual to the decoding end.

For example, at the decoding end, the current image block can be decoded by the following processes.

1) Receive the residual and the index of the motion vector of the current image block in the motion vector candidate list from the encoding end.

2) Obtain a motion vector candidate list through the method according to the embodiments of the present disclosure, where the motion vector candidate list obtained by the decoding end is consistent with the motion vector candidate list obtained by the encoding end.

3) Obtain the motion vector MV1 of the current image block from the motion vector candidate list according to the index.

4) Obtain the predicted image block of the current image block, and then combine the residuals to obtain the current image block by decoding according to the motion vector MV1.

That is, in the first type of mode, the motion vector of the current image block is equal to a motion vector prediction (MVP). In some standards, this first type of mode is also called a Merge mode.

In the second type of mode, the difference from the first type of mode is that after the encoding end selects a best motion vector MV1 from the motion vector candidate list, the MV1 is also used as a search starting point to perform a motion search, and a displacement between a position of a final search result and the search starting point is used as a motion vector difference (MVD). Then, according to a motion vector MV1+MVD of the current image block, a predicted image block of the current image block is determined from the reference image. The encoding end also sends the MVD to the decoding end. In some standards, this second type of mode is also referred to as AMVP mode (i.e., normal inter prediction mode).

The construction methods of the motion vector candidate lists in different types of modes may be the same or different. The motion vector candidate list constructed in the same way may only be applicable to one type of mode, or may be applicable to different types of construction modes, which is not limited here.

This disclosure provides motion vector candidate lists constructed in two modes. For the convenience of description, the motion vector candidate lists constructed in two modes are referred to as a first motion vector candidate list and a second motion vector candidate list in the following. One difference between the two lists is that at least one candidate in the first motion vector candidate list includes a motion vector of a sub-block, and each candidate in the second motion vector candidate list includes a motion vector of an image block. As mentioned above, the image block and the current image block are the same type of concept, and both refer to a prediction unit (or a coding unit), and the sub-block refers to one of multiple sub-blocks obtained by dividing the image block. When a candidate in the first motion vector candidate list is used for prediction, a reference block of the current image block is determined according to the candidate, and then a residual of the image block and the reference block is calculated. When a candidate in the second motion vector candidate list is used for prediction, if the candidate used is a motion vector of a sub-block, a reference block of each sub-block of the current image block is determined according to the candidate, a residual of each sub-block of the current image block and its reference block is calculated, and the residuals of various sub-blocks are combined to form the residual of the current image block.

When candidates in the first motion vector candidate list and/or the second motion vector candidate list are being determined, one of the candidates may be determined according to the ATMVP technology. In some embodiments, when the first motion vector candidate list is constructed, the motion vectors determined according to the ATMVP technology may be added to the list as the first candidate. In some embodiments, when the second motion vector candidate list is constructed, and after candidates are added to the second motion vector candidate list according to the motion vectors of a preset number of spatial neighboring blocks at preset positions of the current image block, a motion vector determined according to the ATMVP technology may be added to the list as a candidate. The order of adding the candidates of the two candidate lists can be another order, which is not limited here.

The following is an example of how to determine one of the candidates according to the ATMVP technology based on the method of constructing the second motion vector candidate list.

In describing the construction of the second motion vector candidate list, motion vectors are explained first to facilitate understanding of the following description. A motion vector of an image block may include information of an image pointed to by the motion vector and a displacement. The motion vector of an image block means one image block in the image pointed to by the motion vector that has the displacement relative to the image block. For an encoded/decoded image block, the motion vector means a reference image of the encoded/decoded image block, and a displacement of a reference block of the encoded/decoded image block relative to the encoded/decoded image block. The reference block of an image block mentioned in this disclosure refers to an image block used to calculate residuals of the image block.

FIG. 1 is a schematic flowchart of a video image processing method according to an embodiment of the present disclosure. The method includes following processes.

At S110, M candidate motion vectors for adding to a second motion vector candidate list of a current image block are obtained.

The current image block is an image block to be encoded (or decoded). An image frame where the current image block is located is referred to as a current frame. For example, the current image block is a coding unit (CU).

For example, the second motion vector candidate list of the current image block may be a Merge candidate list or an AMVP candidate list. For example, the second motion vector candidate list may be a normal motion vector candidate list (Normal Merge List) among Merge candidate lists. The second motion vector candidate list may also have another name.

The M candidate motion vectors may be determined according to motion vectors of M neighboring blocks of the current image block in the current frame. The neighboring block may be an image block adjacent or having a certain distance to the current image block in the current frame. The M neighboring blocks are image blocks in the current frame that have been encoded (or decoded).

Figure 2:
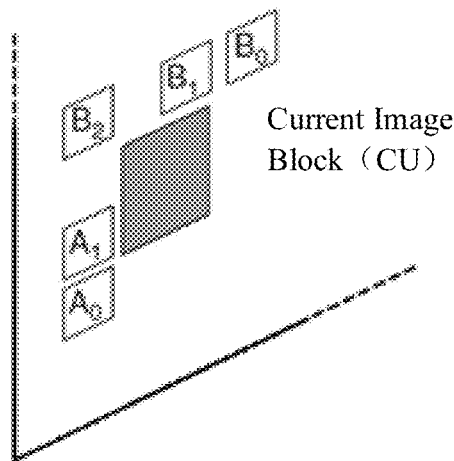
FIG. 2 is a schematic diagram showing obtaining a candidate motion vector of a current block through a neighboring block of a current image block.

For example, as shown in FIG. 2, the M neighboring blocks of the current image block are the image blocks at four locations $A_1$ (left)→$B_1$ (top)→$B_0$ (upper right)→$A_0$ (lower left) around the current image block. The M (that is, M equals 4) candidate motion vectors of the current image block are determined according to the motion vectors of the image blocks at these four locations.

Further, when an unavailable neighboring block exists in the M neighboring blocks, or a neighboring block that uses an intra-coding mode exists in the M neighboring blocks, the motion vector of the unavailable neighboring block or the neighboring block that uses the intra-coding mode is not available. Therefore, the motion vector of the unavailable neighboring block is not used as a candidate motion vector, and the unavailable motion vector is not added to the second motion vector candidate list of the current image block.

In some embodiments, after the process of S110 is completed, the M candidate motion vectors are added to the second motion vector candidate list. At S120, the second motion vector candidate list may be directly scanned.

At S120, N candidate motion vectors among the M candidate motion vectors are scanned sequentially, and a reference motion vector is determined according to a scan result, where N is smaller than M, and M and N are both natural numbers.

No matter whether all of the M candidate motion vectors are added to the second motion vector candidate list, or only some candidate motion vectors among the M candidate motion vectors are added to the second motion vector candidate list because some candidate motion vectors among the M candidate motion vectors are unavailable, N candidate motion vectors among the M candidate motion vectors are always scanned sequentially. Always scanning the N candidate motion vectors among the M candidate motion vectors sequentially may refer to always scanning the candidate motion vectors that have been added to the candidate motion vector list among the N candidate motion vectors, or refer to always scanning the N candidate motion vectors that have been added to the candidate motion vector list among the M candidate motion vectors.

Determining the reference motion vector according to the scan result of the N candidate motion vectors may include checking the N candidate motion vectors sequentially based on a preset condition and determining the reference motion vector according to the checking result.

For example, the preset condition includes that the image block can obtain or not use the intra prediction mode, and a reference frame pointed to by the candidate motion vector is the same as a reference image of the current image block.

The reference image of the current image block is a reference image with a shortest temporal distance to the image where the current image block is located, or the reference image of the current image block is a reference image preset at the encoding and decoding ends, or the reference image of the current image block is a reference image specified in a video parameter set, a sequence header, a sequence parameter set, an image header, an image parameter set, or a slice header.

For example, the reference image of the current image block is a collocated frame of the current image block, and the collocated frame is a frame set in a slice-level information header for obtaining motion information for prediction. In some application scenarios, the collocated frame is also referred to as a collocated picture.

According to the evolution of future technology, the preset condition may be given other different definitions, and the corresponding solution also falls within the scope of the present disclosure.

The process of determining the reference motion vector according to the scan result of N candidate motion vectors is described in detail below.

At S120, only N motion vectors among the M candidate motion vectors that are obtained in the process of S110 are scanned, which can reduce the number of scans.

In some embodiments, at S120, the first N candidate motion vectors among the M candidate motion vectors may be sequentially scanned.

In some embodiments, at S120, the last N candidate motion vectors among the M candidate motion vectors may be sequentially scanned, or, the middle N candidate motion vectors among the M candidate motion vectors may be sequentially scanned, which is not limited in the disclosure.

For one example, at S120, some of the candidate motion vectors among the M candidate motion vectors are sequentially scanned.

For another example, at S120, some of the candidate motion vectors among the candidate motion vectors that are currently added to the second motion vector candidate list are sequentially scanned.

At S130, candidate motion vectors to be added to the second motion vector candidate list are continued to be determined according to the reference motion vector, the current image block, and the reference image of the current image block. That is, additional candidate motion vectors to be added to the second motion vector candidate list can be determined according to the reference motion vector, the current image block, and the reference image of the current image block.

The second motion vector candidate list of the current image block includes the M candidate motion vectors determined in process S110 and the candidate motion vectors determined in process S130. In one example, after the (M+1)th candidate motion vector to be added to the second motion vector candidate list is determined according to the process S130, other candidate motion vectors to be added to the second motion vector candidate list are also continued to be determined according to other methods, which is not limited here.

After the second motion vector candidate list is constructed, as shown in FIG. 1, the method further includes determining a motion vector of the current image block according to the second motion vector candidate list obtained at S130 (S140).

The solution provided in this disclosure can be applied to the ATMVP technology. In the first step of the ATMVP technology, a time-domain vector of the current image block is obtained by scanning all candidate motion vectors that are currently added in the second motion vector candidate list. For example, the second motion vector candidate list is usually filled with 4 spatial-domain candidate motion vectors, hence all the 4 candidate motion vectors may need to be scanned to obtain the time-domain vector of the current image block.

In some embodiments, in the process of obtaining the reference motion vector of the current image block, only N (N is smaller than M) candidate motion vectors among the M candidate motion vectors that have been obtained are sequentially scanned. Comparing with the existing technology, the number of scans of the candidate motion vectors in the process of obtaining the reference motion vector of the current image block can be reduced. Applying the solution provided by the present disclosure to the first step of the ATMVP technology can simplify the redundant operations.

An official test sequence of the latest reference software VTM-2.0 of versatile video coding is selected as the test sequence. The test configuration is RA configuration and LDB configuration. The solution provided by this disclosure is tested and the test result shows that the performance gain of ATMVP technology can still be maintained after the number of scans is reduced.

Therefore, the solution provided in this disclosure can reduce the complexity of the ATMVP technology while maintaining the performance gain of the ATMVP technology.

The second motion vector candidate list formed according to the construction method provided by this disclosure may be applied to the encoding end or the decoding end. In other words, the execution entity of the method provided by the present disclosure may be the encoding end or the decoding end.

For example, the second motion vector candidate list formed by the construction solution provided in this disclosure can be applied to the above-described first type of mode (e.g., Merge mode).

In some embodiments, at S110, according to the motion vectors of the 4 neighboring blocks of the current image block in the current frame, the 4 candidate motion vectors to be added to the second motion vector candidate list of the current image block are determined. That is, M is equal to 4. At S120, N candidate motion vectors among the 4 candidate motion vectors are scanned, and N is smaller than 4.

For example, N is equal to 1. At S120, only the first motion vector candidate in the second motion vector candidate list is scanned. For another example, N is equal to 2 or 3.

The method for determining the reference motion vector of the current image block according to the scan result of the N candidate motion vectors at S120 is described below.

At S120, it is determined one by one whether the N candidate motion vectors among the M candidate motion vectors satisfy the preset condition, and the reference motion vector is determined according to the determination result. In some embodiments, the preset condition is that the reference frame pointed to by the candidate motion vector is the same as the reference image of the current image block.

In some embodiments, at S120, the N candidate motion vectors are sequentially scanned. When a first candidate motion vector that meets the preset condition is determined, that is, when a first candidate motion vector that points to a reference frame same as the collocated frame of the current frame is determined, the scanning is stopped, and the reference motion vector is determined according to the first scanned candidate motion vector that meets the preset condition.

When the first candidate motion vector meeting the preset condition is scanned, the number of scans may be equal to N, or smaller than N. For example, when the candidate motion vector of the first scan satisfies the preset condition, the scanning is stopped, and this candidate motion vector is used as the reference motion vector of the current image block.

In some embodiments, at S120, when no candidate motion vector meeting the preset condition is found among the N candidate motion vectors, that is, when the reference frames pointed to by the N candidate motion vectors are all different from the collocated frame of the current image block, a default value is used as the value of the reference motion vector.

For example, the default value is (0, 0), that is, the reference motion vector is (0, 0). According to actual scenarios, the default value may have other definitions.

In some embodiments, at S120, when no candidate motion vector meeting the preset condition is found among the N candidate motion vectors, that is, when the reference frames pointed to by the N candidate motion vectors are all different from the collocated frame of the current image block, a specific candidate motion vector in the second motion vector candidate list is scaled, and the reference motion vector is determined according to the scaled specific candidate motion vector.

The specific candidate motion vector may be the first motion vector or the last motion vector obtained according to the scanning order among the N candidate motion vectors.

The specific candidate motion vector may also be a motion vector obtained in other scanning order among the N candidate motion vectors.

When the preset condition is that the reference frame pointed to by the candidate motion vector is the same as the reference frame of the current image block, the specific candidate motion vector in the second motion vector candidate list is scaled. Determining the reference motion vector according to the scaled specific candidate motion vector includes scaling the specific candidate motion vector in the second motion vector candidate list, so that the reference frame pointed to by the scaled specific candidate motion vector is the same as the reference image of the current image block, and using the scaled specific candidate motion vector as the reference motion vector.

Figure 3:
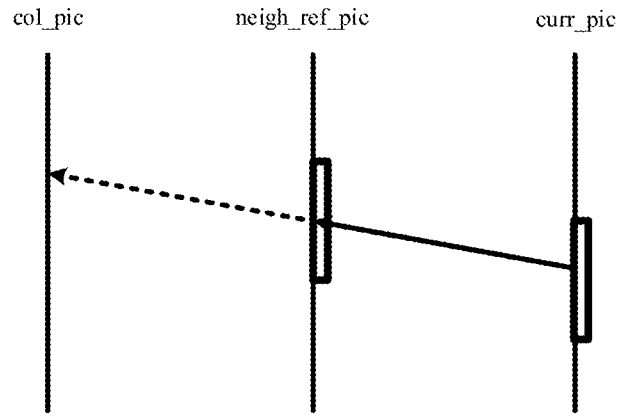
FIG. 3 is a schematic diagram showing scaling a candidate motion vector.

As shown in FIG. 3, curr_pic represents the image where the current image block is located, col_pic represents the collocated frame of the current image block, and neigh_ref_pic represents the reference frame pointed to by the specific candidate motion vector. In some embodiments, a scaling factor of the specific motion vector is determined according to a temporal distance between the reference image neigh_ref_pic pointed to by the specific candidate motion vector and the image curr_pic where the image block corresponding to the specific motion vector is located, and a temporal distance between the reference image col_pic of the current image block and the image curr_pic where the current image block is located.

The difference in the motion intensity between one image frame and another image frame is poor. In the scenario with intense motion between the current frame and its collocated frame, if the motion vector (0, 0) is used as the basis for locating the corresponding block of the current block, the movement between frames is not considered and the absolute coordinates of the current block in the collocated frame are directly assumed to have not changed, and in fact there is a high probability that the coordinates of the current block in the collocated frame are different from the coordinates of the current block in the current frame. Therefore, a large deviation may occur.

In the embodiments of the present disclosure, when no candidate motion vector whose reference frame is the same as the collocated frame of the current frame is found among the N candidate motion vectors, one candidate motion vector among the N candidate motion vectors is scaled to make the reference frame the same as the collocated frame of the current frame, and then the scaled candidate motion vector is used as the motion vector of the current image block. In this way, the accuracy of the motion vector of the current image block can be improved.

In some embodiments, when N is an integer smaller than M and greater than 1, the specific candidate motion vector in the embodiments may be a candidate motion vector that has a shortest temporal distance between the reference frame and the collocated frame of the current image block among the N candidate motion vectors.

Selecting a candidate motion vector with the shortest distance between the reference frame and the collocated frame of the current frame among the N candidate motion vectors to scale can reduce the time for scaling processing, thereby improving the efficiency of obtaining the motion vector of the current image block.

In some embodiments, when N is an integer smaller than M and greater than 1, the specific candidate motion vector in the embodiments may also be any candidate motion vector among the N candidate motion vectors.

When N is equal to 1, the specific candidate motion vector in the embodiments is the scanned candidate motion vector.

In some embodiments, N is equal to 1. At S120, a reference motion vector of the current image block is obtained by scanning one candidate motion vector in the second motion vector candidate list. When the scanned candidate motion vector points to a reference frame that is different from the collocated frame of the current frame where the current image block is located, the candidate motion vector is scaled so that the reference frame of the scaled candidate motion vector is the same as the collocated frame of the current frame, and the scaled candidate motion vector is used as the reference motion vector of the current image block. When the reference frame of the scanned candidate motion vector is the same as the collocated frame of the current frame, the candidate motion vector is used as the motion vector of the current image block.

In some embodiments, the motion vector of the current image block is obtained by scanning one candidate motion vector in the candidate motion vector list, the number of times of scanning the candidate motion vector in the process of obtaining the motion vector of the current image block is effectively reduced. When the reference frame of the scanned candidate motion vector is different from the collocated frame of the current frame, the candidate motion vector is scaled to make the reference frame the same as the collocated frame of the current frame, and then the scaled candidate motion vector is used as the motion vector of the current image block. In this way, the accuracy of the motion vector of the current image block can be improved. Therefore, compared with the existing technology, the solution provided by the embodiments of the present disclosure not only can simplify the process of determining the motion vector of the current image block, but also can improve the accuracy of the motion vector of the current image block.

When the preset condition changes, the process of scaling the specific candidate motion vector in the second motion vector candidate list also needs to be changed accordingly, that is, to ensure that the scaled specific candidate motion vector satisfies the preset condition.

The process of determining candidate motion vectors to be added to the second motion vector candidate list according to the reference motion vector, the current image block, and the reference image of the current image block at S130 is described below.

In some embodiments, determining candidate motion vectors to be added to the second motion vector candidate list according to the reference motion vector, the current image block, and the reference image of the current image block includes dividing the current image block into multiple sub-blocks, determining a related block of the sub-block in the reference image of the current image block according to the reference motion vector, and determining the candidate motion vector to be added to the second motion vector candidate list according to the motion vector of the related block.

For example, the motion vector of the related block of each sub-block in the current image block is added as a candidate to the second motion vector candidate list. When the candidate is used for prediction, the motion vector of the related block of each sub-block in the current image block is used for prediction of the sub-block.

For example, a representative motion vector of the related block of the current image block is added as a candidate to the second motion vector candidate list, and the candidate is identified as determined according to the ATMVP technology. When the candidate is used for prediction, the related block of the current image block is determined according to the identifier and the candidate, and the current image block and the related block are divided into multiple sub-blocks in the same way. Sub-blocks in the current image block correspond to sub-blocks in the related block in a one-to-one correspondence. Various sub-blocks in the current image block are respectively predicted according to the motion vectors of various corresponding sub-blocks in the related block. In some embodiments, when a sub-block with an unavailable motion vector exists in the related block, the representative motion vector of the related block is used to replace the unavailable motion vector to predict the corresponding sub-block in the current image block. In some embodiments, when a sub-block with an unavailable motion vector exists in the related block and no representative motion vector of the related block is available, the candidate determined according to the ATMVP technology is not added to the second motion vector candidate list. For example, when the sub-block in the related block is not available, or the sub-block in the related block uses the intra-coding mode, it is determined that there exists a sub-block with an unavailable motion vector in the related block.

In some embodiments, the representative motion vector of the related block of the current image block may refer to a motion vector at a center position of the related block, or another motion vector representing the related block, which is not limited here.

In some video encoding/decoding standards, the related block may be referred to as a collocated block or corresponding block.

For example, the current image block is a CU, and the sub-block obtained after dividing the CU may be referred to as a sub-CU. In some embodiments, the size of the sub-block and/or the size of the related block of the sub-block is fixed to be greater than or equal to 64 pixels. In some embodiments, the size of the sub-block and/or the size of the related block of the sub-block are both fixed at 8×8 pixels.

In the ATMVP technology, the size of the sub-block can be adaptively set at the frame level. The size of the sub-block is 4×4 by default. When a certain condition is met, the size of the sub-block is set to 8×8. For example, at the encoding end, when the current image block is encoded, the average block size of each sub-block in the CU is calculated when the last encoded image block in the same time-domain layer is encoded in ATMVP mode. When the average block size is greater than a threshold, the size of the sub-block of the current image block is set to 8×8, otherwise the default value of 4×4 is used. At present, in a new generation of the versatile video coding standard (VVC), the motion vector is stored with a size of 8×8. When the size of the sub-block is set to 4×4, the size of the motion vector of the sub-block (also 4×4) does not meet the storage granularity of the motion vector in the current standard. In addition, in the ATMVP technology, when the current image block is encoded, information about the size of the sub-block of the previous encoded image block in the same time-domain layer needs to be stored.

In the embodiments of the present disclosure, the size of the sub-block of the current image block can be set to 8×8 to adapt to the storage granularity of the motion vector specified in the video standard VVC on the one hand, and on the other hand, there is no need to store the information of the size of the sub-block of the last encoded image block, therefore, the storage space is saved.

On the premise that the size of the sub-block and/or the related block of the sub-block is fixed to be equal to 64 pixels, the size of the sub-block and/or the related block of the sub-block may also be other dimensions, for example, the size of the sub-block and/or the size of the related block of the sub-block is A×B, where A≤64, B≤64, and A and B are both multiples of 4. For example, the size of the sub-block and/or the size of the related block of the sub-block is 4×16 pixels, or 16×4 pixels.

In some embodiments, according to the reference motion vector, the current image block, and the reference image of the current image block, determining the candidate motion vector to be added to the second motion vector candidate list includes determining the related block of the current image block in the reference image of the current image block according to the reference motion vector, and determining the candidate motion vector to be added to the second motion vector candidate list according to the motion vector of the related block.

In the encoding/decoding technology, the encoded/decoded image is generally used as the reference image of the current image to be encoded/decoded. In some embodiments, a reference image may also be constructed to improve the similarity between the reference image and the current image to be encoded/decoded.

For example, there is a specific type of encoding/decoding scene in the video content, in which the background basically does not change and only the foreground in the video changes or moves. For example, video surveillance belongs to this type of scene. In video surveillance scenes, the surveillance camera is usually fixed or only moves slowly, and it can be considered that the background basically does not change. In contrast, objects such as people or cars photographed by the video surveillance cameras often move or change, and it can be considered that the foreground changes frequently. In such scenes, a specific reference image can be constructed, and the specific reference image contains only high-quality background information. The specific reference image may include multiple image blocks, and any one image block is taken from a decoded image. Different image blocks in the specific reference image may be taken from different decoded images. When inter prediction is being performed, the specific reference image can be referred to for the background part of the current image to be encoded/decoded, thereby reducing residual information of inter prediction and improving encoding/decoding efficiency.

The above is a specific example for a specific reference image. In some embodiments, the specific reference image has at least one of the following properties: composite frame, long-term reference image, or image not for outputting. The image not for outputting refers to an image that is not output for displaying. Generally, the image not for outputting exists as a reference image to other images. For example, the specific reference image may be a composite long-term reference image, or may be a composite frame that is not output, or may be a long-term reference image that is not output, and so on. In some embodiments, the composite frame is also referred to as a composite reference frame.

In some embodiments, the non-specific reference image may be a reference image that does not have at least one of the following properties: composite frame, long-term reference image, or image not for outputting. For example, the non-specific reference image may include a reference image other than a composite frame, or include a reference image other than a long-term reference image, or include a reference image other than an image not for outputting, or include a reference image other than a composite long-term reference image, or include a reference image other than a composite frame that is not output, or include a reference image other than a long-term reference image that is not output, and so on.

In some embodiments, when the image in the video can be used as a reference image, the image can be a long-term reference image or a short-term reference image. The short-term reference image is a concept corresponding to the long-term reference image and the short-term reference image exists in the reference image buffer for a period of time. After the operation of moving a decoded reference image after the short-term reference image in and out of the reference image buffer is performed for a number of times, the short-term reference image is removed from the reference image buffer. The reference image buffer may also be referred to as a reference image list buffer, a reference image list, a reference frame list buffer, or a reference frame list, etc., which are all referred to as a reference image buffer in this disclosure.

The long-term reference image (or part of the data in the long-term reference image) can always exist in the reference image buffer, and the long-term reference image (or part of the data in the long-term reference image) is not affected by the decoded reference image moving in and out of the reference image buffer. The long-term reference image (or part of the data in the long-term reference image) is only removed from the reference image buffer when the decoding end sends an update instruction.

The short-term reference image and the long-term reference image may be called differently in different standards. For example, in standards such as H.264/advanced video coding (AVC) or H.265/HEVC, the short-term reference image is called a short-term reference frame, and the long-term reference image is called a long-term reference frame. For another example, in standards such as audio video coding standards (AVS) 1-P2, AVS2-P2, and Institute of Electrical and Electronics Engineers (IEEE) 1857.9-P4, the long-term reference image is called a background picture. As another example, in standards such as VP8 and VP9, the long-term reference image is called a golden frame.

The specific terminology used in the embodiments of the present disclosure does not mean that it must be applied to a specific scene. For example, referring to a long-term reference image as a long-term reference frame does not mean that the technologies corresponding to the standards of H.264/AVC or H.265/HEVC must be applied.

The long-term reference image described above may be obtained by constructing image blocks extracted from multiple decoded images, or updating existing reference frames (for example, pre-stored reference frames) using multiple decoded images. The composite specific reference image may also be a short-term reference image. Or, the long-term reference image may not be the composite reference image.

In the above embodiments, the specific reference image may include a long-term reference image, and the non-specific reference image may include a short-term reference image.

In some embodiments, the type of the reference frame can be identified by a special field in the stream structure.

In some embodiments, when the reference image is determined to be a long-term reference image, the reference image is determined to be a specific reference image. When the reference image is determined to be a frame that is not output, the reference image is determined to be a specific reference image. When the reference image is determined to be a composite frame, the reference image is determined to be a specific reference image. When the reference image is determined to be a frame that is not output and the reference image is further determined to be a composite frame, the reference image is determined to be a specific reference image.

In some embodiments, various types of reference images may have corresponding identifiers. At this time, for the decoding end, it may be determined whether the reference image is a specific reference image according to the identifier of the reference image.

In some embodiments, when it is determined that the reference image has the identifier of the long-term reference image, the reference image is determined to be a specific reference image.

In some embodiments, when it is determined that the reference image has an identifier that is not output, it is determined that the reference image is a specific reference image.

In some embodiments, when it is determined that the reference image has an identifier of the composite frame, the reference image is determined to be a specific reference image.

In some embodiments, when it is determined that the reference image has at least two of the following three identifiers: the identifier of the long-term reference image, the identifier that is not output, the identifier of the constructed frame or the composite reference frame, the reference image is determined to be a specific reference image. For example, when it is determined that the reference image has an identifier that is not output, and it is determined that the reference image has an identifier of the composite frame, the reference image is determined to be a specific reference image.

In some embodiments, the image may have an identifier indicating whether it is a frame to be output. When an image is indicated to be not output, the frame is indicated to be a reference image. Further, it is determined whether the frame has an identifier of the composite frame. When the frame has the identifier of the composite frame, the reference image is determined to be a specific reference image. If an image is indicated to be output, the frame is directly determined to not be a specific reference image without determining whether it is a composite frame. Or, if an image is indicated to be not output, but has an identifier indicating it is not a composite frame, the frame can be determined to not be a specific reference image.

In some embodiments, the reference image can be determined to be a specific reference image when it is determined that the reference image meets one of the following conditions by analyzing parameters from a picture header, a picture parameter set, or a slice header: the reference image is a long-term reference image, the reference image is a composite reference image, and the reference image is an image not for outputting, or the reference image is an image not for outputting and is further determined to be a composite reference image.

In some embodiments, the process of determining the motion vector of the current image block involves using a motion vector of a certain image block on another image to determine the motion vector of the image block. For convenience of description, the image block is referred to as a first image block, and the certain image block on another image to be used is referred to as a time-domain reference block or a related block of the first image block. The first image block and the time-domain reference block (or the related block) of the first image block are located on different images. Then, in the process of determining the motion vector of the first image block using the motion vector of the time-domain reference block (or the related block), the motion vector of the time-domain reference block (or the related block) needs to be scaled. For convenience of description, the term "related block" is used in the disclosure.

For example, when the ATMVP technology is applied in constructing the AMVP candidate list, and when the motion vector of the related block of the current image block is determined according to the ATMVP technology, the motion vector of the related block needs to be scaled, and then motion vector of the current image block is determined according to the scaled motion vector. Generally speaking, a scaling factor of the motion vector of the related block is determined based on a temporal distance between the reference image pointed to by the motion vector of related block and the image where the related block is located, and a temporal distance between the reference image of the current image block and the image where the current image block is located.

In one example, the motion vector of the related block is referred to as MV 2, and the index value of the reference frame of the reference image pointed to by the motion vector MV 2 is x. The index value x of the reference frame is the difference between the sequence number of the reference image pointed to by MV 2 (for example, POC) and the sequence number of the image where the related block is located. The index value of the reference frame of the reference image of the first image block is y. The index value y of the reference frame is the difference between the sequence number of the reference image of the first image block and the sequence number of the image where the first image block is located. Then, the scaling factor of the motion vector MV 2 is y/x. In some embodiments, the product of the motion vector MV 2 and y/x may be used as the motion vector of the first image block.

However, when the motion vector MV 2 of the related block points to a specific reference image, or when the reference image of the first image block is a specific reference image, because the definition of the temporal distance between the specific reference image and the image where the first image block is located is not clear, it may be meaningless to scale the motion vector MV 2 of the related block.

In some embodiments, when the motion vector of the current image block is determined according to the motion vector of the related block, and when the motion vector of the related block points to a specific reference image, or the reference image of the current image block is a specific reference image, the motion vector of the current image block is determined according to a processed motion vector of the related block. The processed motion vector of the related block is the same as the motion vector of the related block before processing.

For example, the processed motion vector of the related block includes a motion vector obtained by scaling the motion vector of the related block according to a scaling factor of 1, or a motion vector of the related block skipping the scaling process.

In some embodiments, when the motion vector of the current image block is determined according to the motion vector of the related block, and when the motion vector of the related block points to a specific reference image, or when the reference image of the current image block is a specific reference image, the motion vector of the current image block is determined without referencing to the motion vector of the related block.

In some embodiments, at S120, if no candidate motion vector that meets a preset condition is found among the N candidate motion vectors, a specific candidate motion vector in the second motion vector candidate list is scaled, and then a reference motion vector is determined according to the scaled specific candidate motion vector. In some embodiments, the method further includes, when the specific candidate motion vector points to the specific reference image, or when the reference image of the current image block is the specific reference image, determining the candidate motion vector to be added to the second motion vector candidate list according to the processed specific candidate motion vector. The processed specific candidate motion vector is the same as the specific candidate motion vector before processing.

The processed motion vector of the related block includes a motion vector obtained by scaling the motion vector of the related block according to a scaling factor of 1, or a motion vector of the related block skipping the scaling process.

In some embodiments, at S120, if no candidate motion vector that meets the preset condition is found among the N candidate motion vectors, a specific candidate motion vector in the second motion vector candidate list is scaled, and then a reference motion vector is determined according to the scaled specific candidate motion vector. In some embodiments, the method further includes, when the specific candidate motion vector points to the specific reference image, or when the reference image of the current image block is the specific reference image, determining the candidate motion vector to be added to the second motion vectors candidate list without referencing to the specific candidate motion vector.

In the embodiments of the present disclosure, in the process of obtaining the reference motion vector of the current image block, only N (N is smaller than M) candidate motion vectors among the M candidate motion vectors that have been obtained are sequentially scanned. Comparing with the existing technology, the number of scans of the candidate motion vectors in the process of obtaining the reference motion vector of the current image block can be reduced. Applying the solution provided by the present disclosure to the first step of the ATMVP technology can simplify the redundant operations.

When no candidate motion vector whose reference frame is the same as the collocated frame of the current frame is found among the N candidate motion vectors, one candidate motion vector among the N candidate motion vectors is scaled to make the reference frame the same as the collocated frame of the current frame, and then the scaled candidate motion vector is used as the motion vector of the current image block. In this way, the accuracy of the motion vector of the current image block can be improved.

Dividing the current image block into multiple sub-blocks with a size of 8×8 can adapt to the storage granularity of the motion vector specified in the video standard VVC on the one hand, and on the other hand, there is no need to store the information of the size of the sub-block of the last encoded image block, therefore, the storage space is saved.

Figure 4:
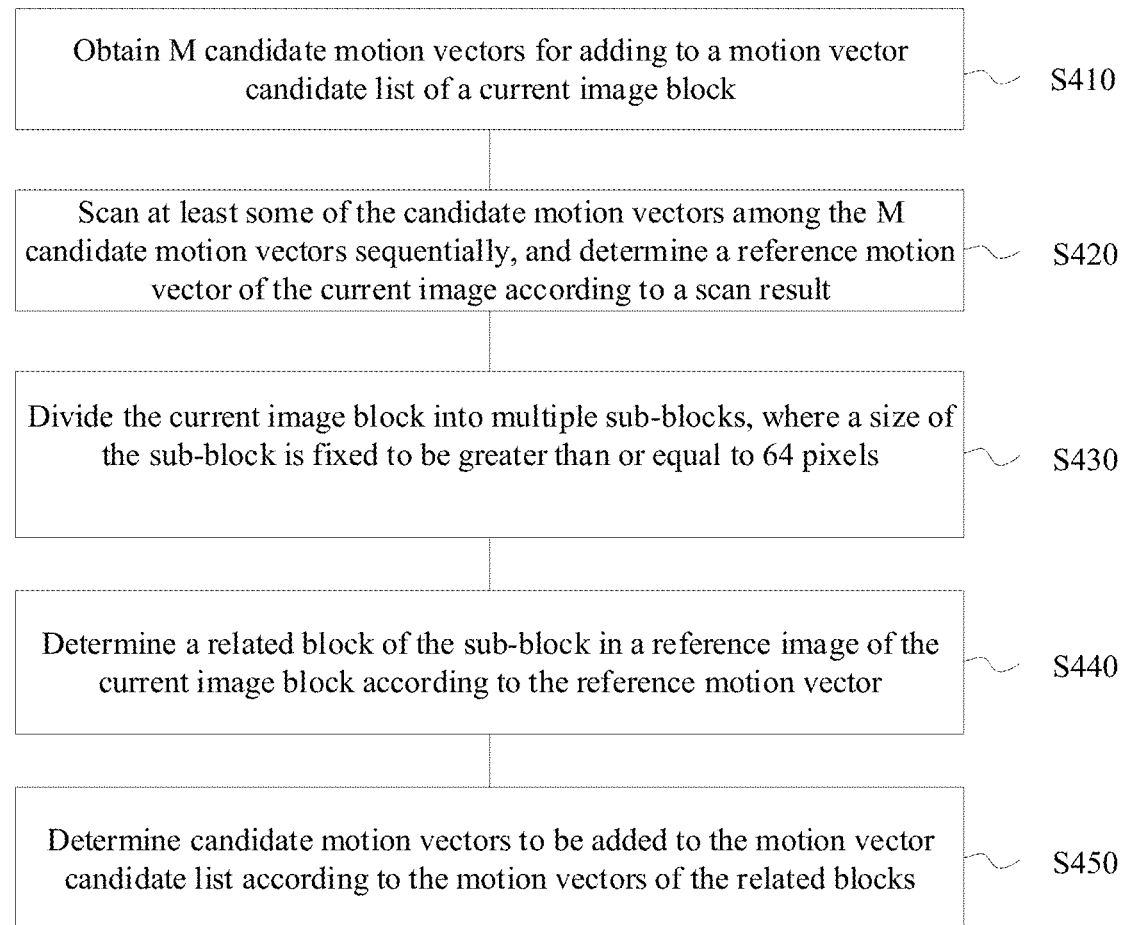
FIG. 4 is another schematic flowchart of a video image processing method according to an embodiment of the disclosure.

FIG. 4 shows a video image processing method according to an embodiment of the present disclosure.

At S410, M candidate motion vectors for adding to a second motion vector candidate list of a current image block are obtained.

The process of S410 corresponds to the process of S110 described above. For the specific description, reference can be made to the description above, which is not repeated here.

At S420, at least some of the candidate motion vectors among the M candidate motion vectors are scanned sequentially, and a reference motion vector of the current image block is determined according to the scan result.

In some embodiments, some of the candidate motion vectors among the M candidate motion vectors are sequentially scanned, and the reference motion vector of the current image block is determined according to the scan result. The process of S420 may correspond to the process of S120 described above. Specific description thereof is omitted.

In some other embodiments, all candidate motion vectors among the M candidate motion vectors are sequentially scanned, and the reference motion vector of the current image block is determined according to the scan result.

For a specific manner of determining the reference motion vector of the current image block according to the scan result at S420, reference may be made to the related description in the foregoing embodiments, and details are not repeated here.

At S430, the current image block is divided into multiple sub-blocks, and a size of the sub-block is fixed to be greater than or equal to 64 pixels.

For example, the current image block is referred to as a CU, and the sub-block obtained after dividing the CU may be referred to as a sub-CU.

At S440, a related block of the sub-block in a reference image of the current image block is determined according to the reference motion vector.

The reference image of the current image block may be a collocated frame of the current image block.

At S450, candidate motion vectors to be added to a second motion vector candidate list are determined according to the motion vectors of the related blocks.

In the ATMVP technology, the size of the sub-block can be adaptively set at the frame level. The size of the sub-block is 4×4 by default. When a certain condition is met, the size of the sub-block is set to 8×8. For example, at the encoding end, when the current image block is encoded, the average block size of each sub-block in the CU is calculated when the last encoded image block in the same time-domain layer is encoded in ATMVP mode. When the average block size is greater than a threshold, the size of the sub-block of the current image block is set to 8×8, otherwise the default value of 4×4 is used. In another word, in the ATMVP technology, when the current image block is encoded, information about the size of the sub-block of the previous encoded image block in the same time-domain layer needs to be stored.

In some embodiments, the size of the sub-block of the current image block is fixed to be greater than or equal to 64 pixels. There is no need to store information about the size of the sub-block of the last encoded image block, therefore, the storage space can be saved.

In some embodiments, the size of the sub-block and/or the size of the related block of the sub-block are both fixed at 8×8 pixels.

In the ATMVP technology, the size of the sub-block can be adaptively set at the frame level. The size of the sub-block is 4×4 by default. When a certain condition is met, the size of the sub-block is set to 8×8. For example, at the encoding end, when the current image block is encoded, the average block size of each sub-block in the CU is calculated when the last encoded image block in the same time-domain layer is encoded in ATMVP mode. When the average block size is greater than a threshold, the size of the sub-block of the current image block is set to 8×8, otherwise the default value of 4×4 is used. At present, in a new generation of the versatile video coding standard (VVC), the motion vector is stored with a size of 8×8. When the size of the sub-block is set to 4×4, the size of the motion vector of the sub-block (also 4×4) does not meet the storage granularity of the motion vector in the current standard. In addition, in the ATMVP technology, when the current image block is encoded, information about the size of the sub-block of the previous encoded image block in the same time-domain layer needs to be stored.

In the embodiments of the present disclosure, the size of the sub-block of the current image block can be set to 8×8 to adapt to the storage granularity of the motion vector specified in the video standard VVC on the one hand, and on the other hand, there is no need to store the information of the size of the sub-block of the last encoded image block, therefore, the storage space is saved.

On the premise that the size of the sub-block and/or the related block of the sub-block is fixed to be equal to 64 pixels, the size of the sub-block and/or the related block of the sub-block may also be other dimensions, for example, the size of the sub-block and/or the size of the related block of the sub-block is A×B, where A≤64, B≤64, and A and B are both multiples of 4. For example, the size of the sub-block and/or the size of the related block of the sub-block is 4×16 pixels, or 16×4 pixels.

In some embodiments, at S420, the at least some of the candidate motion vectors are sequentially scanned. When a first candidate motion vector that meets the preset condition is scanned, the scanning is stopped, and the reference motion vector is determined according to the first scanned candidate motion vector that meets the preset condition.

Determining the reference motion vector according to the first scanned candidate motion vector that meets the preset condition may include using the first candidate motion vector that meets the preset condition as a target neighboring block.

In some embodiments, the preset condition includes that the reference image of the candidate motion vector is the same as the reference image of the current image block.

In some embodiments, at S450, when the motion vector of the related block points to a specific reference image, or when the reference image of the current image block is a specific reference image, the candidate motion vectors to be added to the second motion vector candidate list are determined according to the processed motion vector of the related block. The processed motion vector of the related block is the same as the motion vector of the related block before processing.

For example, the processed motion vector of the related block includes a motion vector obtained by scaling the motion vector of the related block according to a scaling factor of 1, or a motion vector of the related block skipping the scaling process.

In some embodiments, at S450, when the motion vector of the related block points to a specific reference image, or when the reference image of the current image block is a specific reference image, the candidate motion vector to be added to the second motion vector candidate list is determined without referencing to the motion vector of the related block.

In the embodiment as shown in FIG. 4, diving the current image block into multiple sub-blocks with a size of 8×8 can adapt to the storage granularity of the motion vector specified in the video standard VVC on the one hand, and on the other hand, there is no need to store the information of the size of the sub-block of the last encoded image block, therefore, the storage space is saved.

The above describes how to determine the candidates to add to the second motion vector candidate list according to the ATMVP technology. In some embodiments, other candidates may be added to the second motion vector candidate list, which is not limited here.

The methods provided according to the embodiments of the present disclosure are described above with reference to FIGS. 1 and 4, and devices corresponding to the above methods are described below. The description of the devices and the description of the methods correspond to each other. Therefore, for content that is not described in detail, reference can be made to the foregoing description, which is not repeated here.

Figure 5:
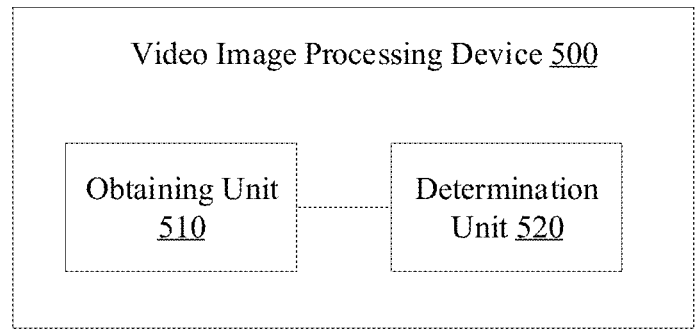
FIG. 5 is a schematic block diagram of a video image processing device according to an embodiment of the disclosure.

FIG. 5 is a schematic block diagram of a device 500 for processing video images according to an embodiment of the present disclosure. The device 500 can be used to execute, e.g., the method embodiment shown in FIG. 1. The device 500 includes an obtaining unit 510 configured to obtain M candidate motion vectors for adding to a second motion vector candidate list of a current image block, and a determination unit 520 configured to sequentially scan the N candidate motion vectors among the M candidate motion vectors and determine a reference motion vector according to a scan result, where N is smaller than M.

The determination unit 520 is further configured to continue to determine candidate motion vectors to be added to the second motion vector candidate list according to the reference motion vector, the current image block, and a reference image of the current image block.

The determination unit 520 is also configured to determine a motion vector of the current image block according to the second motion vector candidate list.

In the first step of the ATMVP technology, a time-domain vector of the current image block is obtained by scanning all candidate motion vectors that are currently added in the second motion vector candidate list. For example, the second motion vector candidate list is usually filled with 4 candidate motion vectors, and all the 4 candidate motion vectors may need to be scanned to obtain the time-domain vector of the current image block.

In the embodiments of the present disclosure, in the process of obtaining the reference motion vector of the current image block, only N (N is smaller than M) candidate motion vectors among the M candidate motion vectors that have been obtained are sequentially scanned. Comparing with the existing technology, the number of scans of the candidate motion vectors in the process of obtaining the reference motion vector of the current image block can be reduced. Applying the solution provided by the present disclosure to the first step of the ATMVP technology can simplify the redundant operations.

An official test sequence of the latest reference software VTM-2.0 of versatile video coding is selected as the test sequence. The test configuration is RA configuration and LDB configuration. The solution provided by this disclosure is tested and the test result shows that the performance gain of ATMVP technology can still be maintained after the number of scans is reduced.

Therefore, the solution provided in this disclosure can reduce the complexity of the ATMVP technology while maintaining the performance gain of the ATMVP technology.

In some embodiments, the obtaining unit 510 is configured to obtain M candidate motion vectors for adding to the second motion vector candidate list of the current image block according to the motion vectors of M neighboring blocks of the current image block in the current frame.

In some embodiments, the neighboring block is an image block that is adjacent to or has a certain distance to the current image block and is on the current frame.

In some embodiments, the determination unit 520 is configured to sequentially scan the first N candidate motion vectors among the M candidate motion vectors.

In some embodiments, M is equal to 4, and N is smaller than 4.

In some embodiments, N is equal to 1 or 2.

In some embodiments, the determination unit 520 is configured to sequentially scan N candidate motion vectors among the M candidate motion vectors based on a preset condition and determine the reference motion vector according to the scan result.

In some embodiments, the preset condition includes that the reference frame pointed to by the candidate motion vector is the same as the reference image of the current image block.

In some embodiments, the determination unit 520 is configured to sequentially scan the N candidate motion vectors. When the first candidate motion vector that meets the preset condition is determined, the scanning is stopped, and according to the first scanned candidate motion vector that meets the preset condition, the reference motion vector is determined.

In some embodiments, the determination unit 520 is configured to scale a specific candidate motion vector in the second motion vector candidate list when no candidate motion vector that meets the preset condition is found among the N candidate motion vectors, and determine the reference motion vector according to the scaled specific candidate motion vector.

In some embodiments, the specific candidate motion vector is the first motion vector or the last motion vector obtained in the scanning order among the N candidate motion vectors.

In some embodiments, the determination unit 520 is configured to scale the specific candidate motion vector in the second motion vector candidate list to make the reference frame pointed to by the scaled specific candidate motion vector the same as the reference image of the current image block, and use the scaled specific candidate motion vector as the reference motion vector.

In some embodiments, the determination unit 520 is configured to use a default value as the reference motion vector when no candidate motion vector that meets the preset condition is found among the N candidate motion vectors.

In some embodiments, the default value is a motion vector of (0, 0).

In some embodiments, the determination unit 520 is configured to divide the current image block into a plurality of sub-blocks, determine a related block of the sub-block in the reference image of the current image block according to the reference motion vector, and determine a candidate motion vector to be added to the second motion vector candidate list according to the motion vector of the related block.

In some embodiments, the size of the sub-block and/or the size of the related block of the sub-block is fixed to be greater than or equal to 64 pixels.

In some embodiments, the current image block is a coding unit CU.

In some embodiments, the determination unit 520 is configured to determine a related block of the current image block in the reference image of the current image block according to the reference motion vector, and determine the candidate motion vector to be added to the second motion vector candidate list according to the motion vector of the related block.

In some embodiments, the determination unit 520 is configured to, when the motion vector of the related block points to the specific reference image, or when the reference image of the current image block is the specific reference image, determine the candidate motion vectors to be added to the second motion vector candidate list according to the processed motion vector of the related block. The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

In some embodiments, the determination unit 520 is configured to, when the motion vector of the related block points to the specific reference image, or when the reference image of the current image block is the specific reference image, determine the candidate motion vector to be added to the second motion vector candidate list without referencing to the motion vector of the related block.

In some embodiments, the determination unit 520 is configured to, when the specific candidate motion vector points to the specific reference image, or when the reference image of the current image block is the specific reference image, determine the candidate motion vectors to be added to the second motion vector candidate list according to the processed specific candidate motion vector. The processed specific candidate motion vector is the same as the specific candidate motion vector before processing.

In some embodiments, the processed motion vector of the related block includes a motion vector obtained by scaling the motion vector of the related block according to a scaling factor of 1, or a motion vector of the related block skipping the scaling process.

In some embodiments, the determination unit 520 is configured to, when the specific candidate motion vector points to the specific reference image, or when the reference image of the current image block is the specific reference image, determine the candidate motion vector to be added to the second motion vector candidate list without referencing to the specific candidate motion vector.

In some embodiments, the second motion vector candidate list is a Merge candidate list.

In some embodiments, the reference image of the current image block is a collocated frame of the current image block.

In some embodiments, the size of the sub-block and/or the size of the related block of the sub-block are fixed at 8×8 pixels.

Both the obtaining unit 510 and the determination unit 520 in the embodiments may be implemented by a processor.

Figure 6:
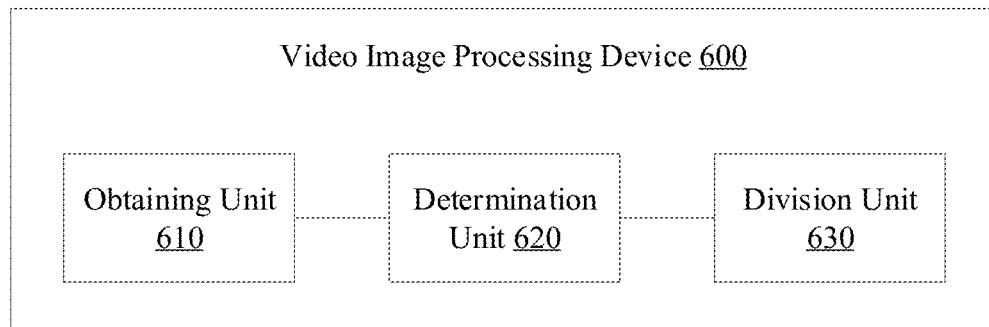
FIG. 6 is another schematic block diagram of a video image processing device according to an embodiment of the disclosure.

FIG. 6 shows a device 600 for processing video images according to another embodiment of the disclosure. The device 600 can be used to execute, e.g., the method embodiment shown in FIG. 4. The device 600 includes an obtaining unit 610 configured to obtain M candidate motion vectors for adding to a second motion vector candidate list of a current image block, a determination unit 620 configured to sequentially scan at least some of the candidate motion vectors among the M candidate motion vectors and determine a reference motion vector according to the scan result, and a division unit 630 configured to divide the current image block into multiple sub-blocks, where a size of the sub-block is fixed to be greater than or equal to 64 pixels.

The determination unit 620 is further configured to determine a related block of the sub-block in a reference image of the current image block according to the reference motion vector.

The determination unit 620 is further configured to determine candidate motion vectors to be added to the second motion vector candidate list according to the motion vector of the related block.

In the ATMVP technology, the size of the sub-block can be adaptively set at the frame level. The size of the sub-block is 4×4 by default. When a certain condition is met, the size of the sub-block is set to 8×8. For example, at the encoding end, when the current image block is encoded, the average block size of each sub-block in the CU is calculated when the last encoded image block in the same time-domain layer is encoded in ATMVP mode. When the average block size is greater than a threshold, the size of the sub-block of the current image block is set to 8×8, otherwise the default value of 4×4 is used. In another word, in the ATMVP technology, when the current image block is encoded, information about the size of the sub-block of the previous encoded image block in the same time-domain layer needs to be stored.

In some embodiments, the size of the sub-block of the current image block is fixed to be greater than or equal to 64 pixels. There is no need to store information about the size of the sub-block of the last encoded image block, therefore, the storage space can be saved.

In some embodiments, the size of the sub-block and/or the size of the related block of the sub-block are both fixed at 8×8 pixels.

At present, in a new generation of the versatile video coding standard (VVC), the motion vector is stored with a size of 8×8. In the embodiments of the present disclosure, the size of the sub-block of the current image block can be set to 8×8 to adapt to the storage granularity of the motion vector specified in the video standard VVC on the one hand, and on the other hand, there is no need to store the information of the size of the sub-block of the last encoded image block, therefore, the storage space is saved.

In some embodiments, the determination unit 620 is configured to sequentially scan the at least some of the candidate motion vectors. When the first candidate motion vector that meets a preset condition is scanned, the scanning is stopped, and according to the first scanned candidate motion vector that meets the preset condition, the reference motion vector is determined.

In some embodiments, the determination unit 620 is configured to use the first candidate motion vector that meets the preset condition as a target neighboring block.

In some embodiments, the preset condition includes that a reference image of the candidate motion vector is the same as the reference image of the current image block.

The obtaining unit 610, the determination unit 620, and the division unit 630 in the embodiments may be implemented by one or more processors.

As described above, a motion vector of an image block may include information of an image pointed to by the motion vector and a displacement. In some application scenarios, the motion vector of an image block only includes the information of "displacement." The image block additionally provides index information for indicating the reference image of the image block. For the encoded/decoded image block, the motion vector means the displacement of the reference block of the encoded/decoded image block on the reference image relative to the image block that has the same location as the encoded/decoded image block and is located in the reference image. When determining the reference block of the encoded/decoded image block, the index information of the reference image of the encoded/decoded image block and the motion vector of the encoded/decoded image block are needed to determine the reference block of the encoded/decoded image block. Then, in the video image processing method shown in FIG. 1, at S120, the candidate motion vectors in the second motion vector candidate list are not scanned, instead, the image blocks corresponding to the candidate motion vectors are scanned directly. In the following, for the new definition of the motion vector (that is, it contains the "displacement" information but not the "image pointed to"), a video image processing method is provided. The methods for determining candidate motion vectors based on ATMVP technology provided for these two different definitions of "motion vector" are basically the same. The above explanations also apply to the video image processing methods provided below. The main difference is in the construction of the second motion vector candidate list. When the candidate added to the second motion vector candidate list is determined according to the ATMVP technology, in the video image processing method described above, the motion vectors that have been added to the second motion vector candidate list are scanned, however, in the video image processing method provided below, the image blocks corresponding to the motion vectors that have been added to the second motion vector candidate list are scanned.

Figure 7:
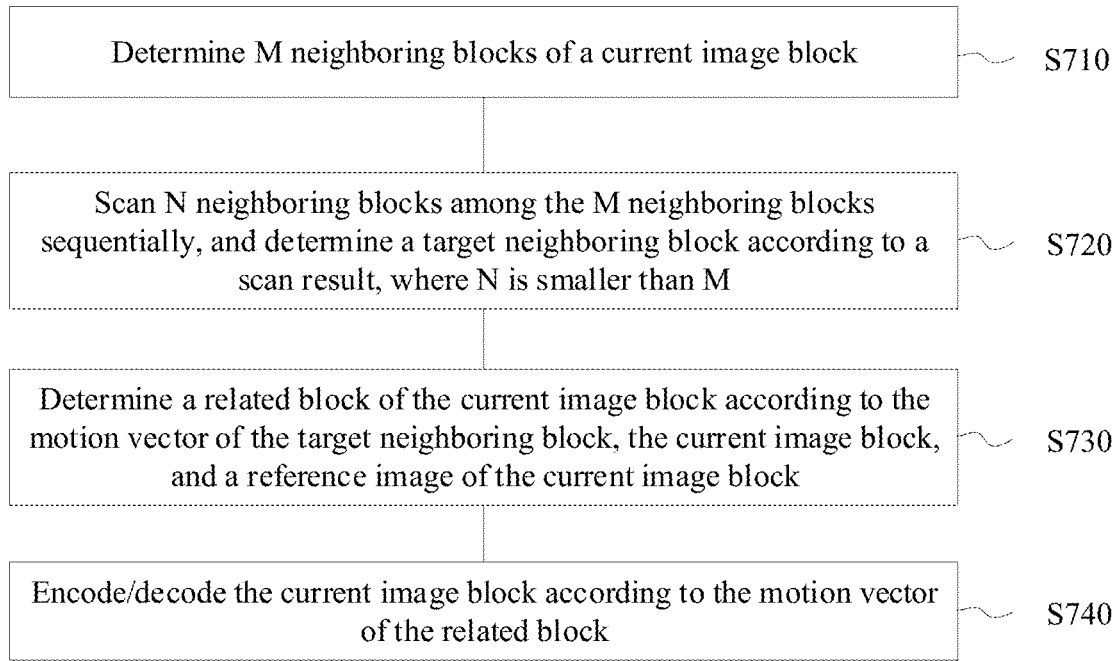
FIG. 7 is a schematic flowchart of a video image processing method according to an embodiment of the disclosure.

FIG. 7 shows a method for processing video images according to an embodiment of the present disclosure.

At S710, M neighboring blocks of a current image block are determined.

The current image block is an image block to be encoded (or decoded). For example, the current image block is a coding unit (CU).

An image frame where the current image block is located is referred to as a current frame.

The neighboring block is an image block adjacent to or having a certain distance to the current image block in a current image.

M neighboring blocks are image blocks in the current frame that have been encoded (or decoded).

For example, as shown in FIG. 2, the 4 neighboring blocks of the current image block are determined in an order of the image blocks shown in FIG. 2 located at four locations $A_1$ (left)→$B_1$ (top)→$B_0$ (upper right)→$A_0$ (lower left) around the current image block.

At S720, the N neighboring blocks among the M neighboring blocks are scanned sequentially, and a target neighboring block is determined according to a scan result, where N is smaller than M.

Determining the target neighboring block according to the scan result of the N neighboring blocks may be determining the N neighboring blocks sequentially based on a preset condition and determining the target neighboring block according to the determination result.

For example, the preset condition is that a reference image of the neighboring block is the same as a reference image of the current image block.

The reference image of the current image block is a reference image with a shortest temporal distance to the image where the current image block is located, or the reference image of the current image block is a reference image preset at the encoding and decoding ends, or the reference image of the current image block is a reference image specified in a video parameter set, a sequence header, a sequence parameter set, an image header, an image parameter set, or a slice header.

For example, the reference image of the current image block is a collocated frame of the current image block, and the collocated frame is a frame set in a slice-level information header for obtaining motion information for prediction.

According to the evolution of future technology, the preset condition may be given other different definitions, and the corresponding solution also falls within the scope of the present disclosure.

The process of determining the target neighboring blocks according to the scan result of N neighboring blocks is described in detail below.

At S720, only N neighboring blocks out of the M neighboring blocks obtained in the process of S710 are scanned, which can reduce the number of scans.

In some embodiments, at S720, the first N neighboring blocks among the M neighboring blocks may be sequentially scanned.

When the M neighboring blocks of the current image block are sequentially determined in a preset order in the process of S710, the first N neighboring blocks obtained in the process of S720 refer to the N neighboring blocks determined first in the preset order.

In some embodiments, at S720, the last N neighboring blocks among the M neighboring blocks may be sequentially scanned, or, the middle N neighboring blocks among the M neighboring blocks may be sequentially scanned, which is not limited in the disclosure.

At S730, a related block of the current image block is determined according to the motion vector of the target neighboring block, the current image block, and the reference image of the current image block.

At S740, the current image block is encoded/decoded according to the motion vector of the related block.

In some embodiments, at S740, the reference block of the current image block is determined according to the motion vector of the related block and the reference image.

For example, at S740, a candidate block list of the current image block is constructed and the candidate blocks in the candidate block list include the M neighboring blocks and the related blocks. The current image block is encoded/decoded according to the reference block of the candidate block in the candidate block list.

In one example, the candidate block list is a Merge candidate list of the current image block. In another example, the candidate block list is an AMVP candidate list of the current image block.

At the encoding end, an index of the candidate block of the current block is written into the bitstream. At the decoding end, after the index is obtained, a candidate block corresponding to the index is found from the candidate block list, and the reference block of the current image block is determined according to the reference block of the candidate block, or the motion vector of the current image block is determined according to the motion vector of the candidate block.

For example, the reference block of the candidate block is directly determined as the reference block of the current image block, or the motion vector of the candidate block is directly determined as the motion vector of the current image block. For another example, at the encoding end, the MVD of the current block is also written into the bitstream. After the MVD is obtained at the decoding end, MVD is added to the motion vector of the candidate block and the result is used as the motion vector of the current block, and then the reference block of the current block is determined according to the motion vector and the reference image of the current block.

In the embodiments of the present disclosure, in the process of obtaining the target neighboring block of the current image block, only N (N is smaller than M) neighboring blocks among the M neighboring blocks that have been obtained are sequentially scanned. Comparing with the existing technology, the number of scans of the candidate neighboring blocks in the process of obtaining the target neighboring blocks of the current image block can be reduced, thereby reducing complexity.

In some embodiments, at S710, the four neighboring blocks of the current image block in the current frame are determined, that is, M is equal to 4. At S720, N neighboring blocks among the 4 neighboring blocks are scanned, and N is smaller than 4.

For example, N is equal to 1. At S720, only the first neighboring block among the four neighboring blocks is scanned.

For another example, N is equal to 2 or 3.

The method of determining the target neighboring block according to the scan results of the N neighboring blocks at S720 is described below.

In some embodiments, at S720, the N neighboring blocks are sequentially scanned. When a first neighboring block that meets the preset condition is found, the scanning is stopped, and the target neighboring block is determined according to the first scanned neighboring block that meets the preset condition.

For example, the preset condition is that the reference image of the neighboring block is the same as the reference image of the current image block.

According to the evolution of future technology, the preset conditions may also be given other definitions.

Hereinafter, the preset condition is that the reference image of the neighboring block is the same as the reference image of the current image block. Examples with this definition are described as follows.

For example, the first neighboring block that meets the preset condition is used as the target neighboring block.

In some embodiments, at S720, when no neighboring block that meets the preset condition is found among the N neighboring blocks, the method further includes scaling the motion vector of a specific neighboring block among the M neighboring blocks, and encoding/decoding the current image block according to a scaled motion vector.

For example, the reference block of the current image block is determined according to the scaled motion vector and the reference image of the current image block.

In some embodiments, the specific neighboring block is the first neighboring block, or the last neighboring block obtained according to a scanning order among the N neighboring blocks.

The specific neighboring block may also be a neighboring block obtained in another scanning order among the N neighboring blocks.

In some embodiments, encoding/decoding the current image block according to the scaled motion vector includes scaling the motion vector of the specific neighboring block to make the reference frame pointed to by the scaled motion vector the same as the reference image of the current image block, and using the image block pointed to by the scaled motion vector in the reference image of the current image block as the reference block of the current image block.

In some embodiments, at S720, when no neighboring block meeting the preset condition is found among the N neighboring blocks, a default block is used as the candidate reference block of the current image block.

For example, the default block is an image block pointed to by a motion vector (0, 0).

The process of determining the related block of the current image block according to the motion vector of the target neighboring block, the current image block, and the reference image of the current image block at S730 is described below.

In some embodiments, determining the related block of the current image block according to the motion vector of the target neighboring block, the current image block, and the reference image of the current image block includes dividing the current image block into multiple sub-blocks, determining the related block of the sub-block in the reference image of the current image block according to the motion vector of the target neighboring block. The related block of the current image block includes the related block of the sub-block.

The related block may be referred to as a collocated block or a corresponding block.

For example, the current image block is a CU, and the sub-block obtained after dividing the CU may be referred to as a sub-CU.

In some embodiments, the size of the sub-block and/or the size of the related block of the sub-block is fixed to be greater than or equal to 64 pixels.

In some embodiments, the size of the sub-block and/or the size of the related block of the sub-block are both fixed at 8×8 pixels.

In the ATMVP technology, the size of the sub-block can be adaptively set at the frame level. The size of the sub-block is 4×4 by default. When a certain condition is met, the size of the sub-block is set to 8×8. For example, at the encoding end, when the current image block is encoded, the average block size of each sub-block in the CU is calculated when the last encoded image block in the same time-domain layer is encoded in ATMVP mode. When the average block size is greater than a threshold, the size of the sub-block of the current image block is set to 8×8, otherwise the default value of 4×4 is used. At present, in a new generation of the versatile video coding standard (VVC), the motion vector is stored with a size of 8×8. When the size of the sub-block is set to 4×4, the size of the motion vector of the sub-block (also 4×4) does not meet the storage granularity of the motion vector in the current standard. In addition, in the ATMVP technology, when encoding the current image block, information about the size of the sub-block of the previous encoded image block in the same time-domain layer needs to be stored.

In the embodiments of the present disclosure, the size of the sub-block of the current image block can be set to 8×8 to adapt to the storage granularity of the motion vector specified in the video standard VVC on the one hand, and on the other hand, there is no need to store the information of the size of the sub-block of the last encoded image block, therefore, the storage space is saved.

On the premise that the size of the sub-block and/or the related block of the sub-block is fixed to be equal to 64 pixels, the size of the sub-block and/or the related block of the sub-block may also be other dimensions, for example, the size of the sub-block and/or the size of the related block of the sub-block is A×B, where A≤64, B≤64, and A and B are both multiples of 4. For example, the size of the sub-block and/or the size of the related block of the sub-block is 4×16 pixels, or 16×4 pixels.

In some embodiments, determining the related block of the current image block according to the motion vector of the target neighboring block, the current image block, and the reference image of the current image block includes determining the related block of the current image block in the reference image of the current image block according to the motion vector of the target neighboring block.

In some embodiments, at S740, when the reference image of the related block is a specific reference image or when the reference image of the current image block is a specific reference image, the candidate reference block of the current image block is determined according to the processed motion vector of the related block and the reference image of the current image block. The processed motion vector of the related block is the same as the motion vector of the related block before processing.

For example, the processed motion vector of the related block includes a motion vector obtained by scaling the motion vector of the related block according to a scaling factor of 1, or a motion vector of the related block skipping the scaling process.

In some embodiments, at S740, when the reference image of the related block is a specific reference image, or when the reference image of the current block is a specific reference image, the candidate reference block of the current image block is determined without referencing to the motion vector of the related block.

In some embodiments, at S720, when the motion vector of the specific neighboring block points to a specific reference image or when the reference image of the current image block is a specific reference image, the reference block of the current image block is determined according to the processed motion vector of the related block and the reference image of the current image block. The processed motion vector of the related block is the same as the motion vector of the related block before processing.

The processed motion vector of the related block includes a motion vector obtained by scaling the motion vector of the related block according to a scaling factor of 1, or a motion vector of the related block skipping the scaling process.

In the embodiments of the present disclosure, in the process of obtaining the target neighboring block of the current image block, only N (N is smaller than M) neighboring blocks among the M neighboring blocks that have been obtained are sequentially scanned. Comparing with the existing technology, the number of scans of the candidate neighboring blocks in the process of obtaining the target neighboring blocks of the current image block can be reduced, thereby reducing complexity.

When no neighboring block whose reference frame is the same as the collocated frame of the current frame is found among the N neighboring blocks, the motion vector of one neighboring block among the N neighboring blocks is scaled to make the reference frame the same as the collocated frame of the current frame, and then the scaled motion vector is used as the motion vector of the current image block. In this way, the accuracy of the motion vector of the current image block can be improved.

Diving the current image block into multiple sub-blocks with a size of 8×8 can adapt to the storage granularity of the motion vector specified in the video standard VVC on the one hand, and on the other hand, there is no need to store the information of the size of the sub-block of the last encoded image block, therefore, the storage space is saved.

In some embodiments, the process of determining the motion vector of the current image block involves using a motion vector of a certain image block on another image to determine the motion vector of the image block. For convenience of description, the image block is referred to as a first image block, and the certain image block on another image to be used is referred to as a time-domain reference block or a related block of the first image block. The first image block and the time-domain reference block (or the related block) of the first image block are located on different images. Then, in the process of determining the motion vector of the first image block using the motion vector of the time-domain reference block (or the related block), the motion vector of the time-domain reference block (or the related block) needs to be scaled. For convenience of description, the term "related block" is used in the disclosure.

For example, when the ATMVP technology is applied in constructing an AMVP candidate list, after the related block of the current image block is determined according to the ATMVP technology, and when the motion vector of the current image block is being determined according to the motion vector of the related block, the motion vector of the related block needs to be scaled, and then motion vector of the current image is determined according to the scaled motion vector. Generally speaking, a scaling factor of the motion vector of the related block is determined based on a temporal distance between the reference image pointed to by the motion vector of related block and the image where the related block is located, and a temporal distance between the reference image of the current image block and the image where the current image block is located.

In one example, the motion vector of the related block is referred to as MV 2, and the index value of the reference frame of the reference image pointed to by the motion vector MV 2 is x. The index value x of the reference frame is the difference between the sequence number of the reference image pointed to by MV 2 (for example, POC) and the sequence number of the image where the related block is located. The index value of the reference frame of the reference image of the first image block is y. The index value y of the reference frame is the difference between the sequence number of the reference image of the first image block and the sequence number of the image where the first image block is located. Then, the scaling factor of the motion vector MV 2 is y/x. In some embodiments, the product of the motion vector MV 2 and y/x may be used as the motion vector of the first image block.

However, when the motion vector MV 2 of the related block points to a specific reference image, or when the reference image of the first image block is a specific reference image, because the definition of the temporal distance between the specific reference image and the image where the first image block is located is not clear, it may be meaningless to scale the motion vector MV 2 of the related block.

In some embodiments, when the motion vector of the current image block is determined according to the motion vector of the related block, and when the motion vector of the related block points to a specific reference image, or when the reference image of the current image block is a specific reference image, the motion vector of the current image block is determined according to the processed motion vector of the related block. The processed motion vector of the related block is the same as the motion vector of the related block before processing.

For example, the processed motion vector of the related block includes a motion vector obtained by scaling the motion vector of the related block according to a scaling factor of 1, or a motion vector of the related block skipping the scaling process.

In some embodiments, when the motion vector of the current image block is determined according to the motion vector of the related block, and when the motion vector of the related block points to a specific reference image, or when the reference image of the current image block is a specific reference image, the motion vector of the current image block is determined without referencing to the motion vector of the related block.

Figure 8:
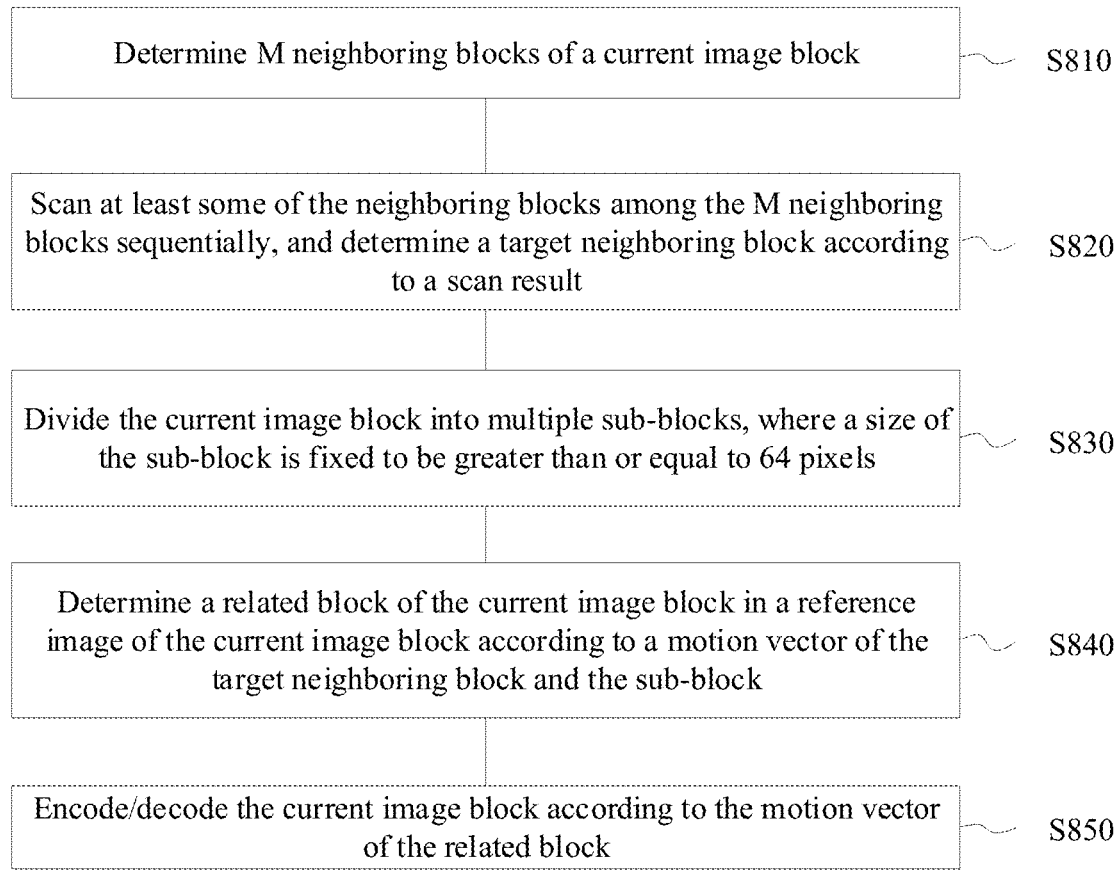
FIG. 8 is another schematic flowchart of a video image processing method according to an embodiment of the disclosure.

FIG. 8 shows a method for processing video images according to another embodiment of the present disclosure.

At S810, M neighboring blocks of a current image block are determined.

The process of S810 may correspond to the process of S710 in the above embodiment.

At S820, at least some of the neighboring blocks among the M neighboring blocks are sequentially scanned, and a target neighboring block is determined according to a scan result.

In some embodiments, some of the neighboring blocks among the M neighboring blocks are sequentially scanned, and the target neighboring block is determined according to a scan result.

In some embodiments, all neighboring blocks among the M neighboring blocks are sequentially scanned, and the target neighboring block is determined according to a scan result.

At S830, the current image block is divided into multiple sub-blocks and a size of the sub-block is fixed to be greater than or equal to 64 pixels.

At S840, a related block of the current image block in a reference image of the current image block is determined according to a motion vector of the target neighboring block and the sub-block.

In some embodiments, the reference image of the current image block is a reference image with a shortest temporal distance to the image where the current image block is located.

In some embodiments, the reference image of the current image block is a reference image preset at the encoding end.

In some embodiments, the reference image of the current image block is a reference image specified in a video parameter set, a sequence header, a sequence parameter set, an image header, an image parameter set, or a slice header.

At S850, the current image block is encoded/decoded according to the motion vector of the related block.

In the embodiments of the disclosure, the size of the sub-block of the current image block is fixed to be greater than or equal to 64 pixels, and there is no need to store the information of the size of the sub-block of the previous encoded image block, therefore, storage space can be saved.

In some embodiments, the size of the sub-block and/or the size of the time-domain reference block of the sub-block are both fixed at 8×8 pixels.

At present, in a new generation of the versatile video coding standard (VVC), the motion vector is stored with a size of 8×8. In the embodiments of the present disclosure, the size of the sub-block of the current image block can be set to 8×8 to adapt to the storage granularity of the motion vector specified in the video standard VVC on the one hand, and on the other hand, there is no need to store the information of the size of the sub-block of the last encoded image block, therefore, the storage space is saved.

On the premise that the size of the sub-block and/or the related block of the sub-block is fixed to be equal to 64 pixels, the size of the sub-block and/or the related block of the sub-block may also be other dimensions, for example, the size of the sub-block and/or the size of the related block of the sub-block is A×B, where A≤64, B≤64, and A and B are both multiples of 4. For example, the size of the sub-block and/or the size of the related block of the sub-block is 4×16 pixels, or 16×4 pixels.

In some embodiments, at step S820, at least some of the neighboring blocks are sequentially scanned. When a first neighboring block that meets a preset condition is scanned, the scanning is stopped, and according to the first scanned neighboring block that meets the preset condition, a target neighboring block is determined.

For example, the first neighboring block that meets the preset condition is used as the target neighboring block.

For example, the preset condition is that the reference image of the neighboring block is the same as the reference image of the current image block.

In some embodiments, at S840, a related block of the sub-block in the reference image of the current image block is determined according to the motion vector of the target neighboring block and the sub-block. The related block of the current image block includes the related block of the sub-block.

The methods provided according to the embodiments of the present disclosure are described above with reference to FIGS. 7 and 8, and devices corresponding to the above methods are described below. The description of the devices and the description of the methods correspond to each other. Therefore, for content that is not described in detail, reference can be made to the foregoing description, which is not repeated here.

Figure 9:
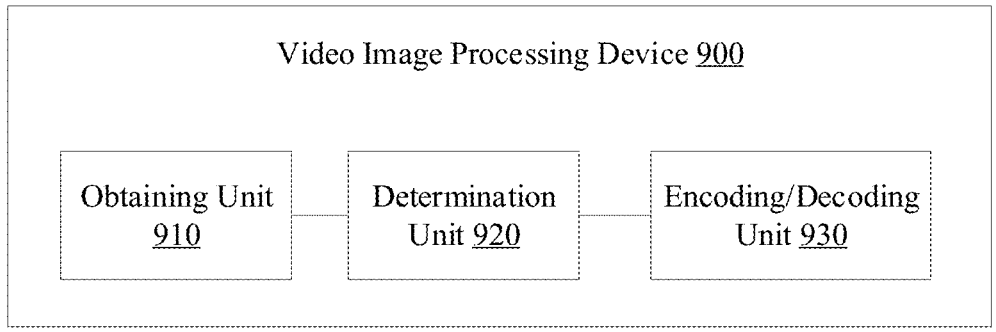
FIG. 9 is another schematic block diagram of a video image processing device according to an embodiment of the disclosure.

FIG. 9 is a schematic block diagram of a device 900 for processing video images according to an embodiment of the present disclosure. The device 900 can be used to execute, e.g., the method embodiment shown in FIG. 7. The device 900 includes an obtaining unit 910 configured to obtain M neighboring blocks of a current image block, a determination unit 920 configured to sequentially scan the N neighboring blocks among the M neighboring blocks and determine a target neighboring block according to a scan result, where N is smaller than M, and an encoding/decoding unit 930 configured to encode/decode the current image block according to the motion vector of a related block of the current image block, which is determined by the determination unit 920 according to a motion vector of the target neighboring block, the current image block, and a reference image of the current image block.

In the embodiments of the present disclosure, in the process of obtaining the target neighboring block of the current image block, only N (N is smaller than M) neighboring blocks among the M neighboring blocks that have been obtained are sequentially scanned. Comparing with the existing technology, the number of scans of the candidate neighboring blocks in the process of obtaining the target neighboring blocks of the current image block can be reduced, thereby reducing complexity.

In some embodiments, M is equal to 4, and N is smaller than 4.

In some embodiments, N is equal to 1 or 2.

In some embodiments, the determination unit 920 is configured to sequentially scan the first N neighboring blocks among the M neighboring blocks.

In some embodiments, the obtaining unit 910 is configured to obtain M neighboring blocks of the current image block sequentially in a preset order. The first N neighboring blocks refer to the N neighboring blocks determined first in the preset order.

In some embodiments, the determination unit 920 is configured to sequentially scan the N neighboring blocks. When a first neighboring block that meets a preset condition is scanned, the scanning is stopped, and a target neighboring block is determined according to the scanned first neighboring block that meets the preset condition.

In some embodiments, the determination unit 920 is configured to use the first neighboring block that meets the preset condition as the target neighboring block.

In some embodiments, the preset condition includes that the reference image of the neighboring block is the same as the reference image of the current image block.

In some embodiments, the encoding/decoding unit 930 is configured to determine a reference block of the current image block according to a motion vector of the related block and a reference image.

In some embodiments, the encoding/decoding unit 930 is configured to construct a candidate block list of the current image block. The candidate blocks in the candidate block list include the M neighboring blocks and the related blocks. According to the reference blocks of the candidate blocks in the candidate block list, the current image block is encoded and decoded.

In some embodiments, the encoding/decoding unit 930 is further configured to, when no neighboring block that meets the preset condition is found among the N neighboring blocks, scale a motion vector of a specific neighboring block among the M neighboring blocks, and encode/decode the current image block according to the scaled motion vector.

In some embodiments, the encoding/decoding unit 930 is configured to determine the reference block of the current image block according to the scaled motion vector and the reference image of the current image block.

In some embodiments, the specific neighboring block is a first neighboring block, or a last neighboring block obtained in a scanning order among the N neighboring blocks.

In some embodiments, the encoding/decoding unit 930 is configured to scale the motion vector of the specific neighboring block to make a reference frame pointed to by the scale motion vector the same as the reference image of the current image block, and use the image block pointed to by the scaled motion vector in the reference image of the current image block as the reference block of the current image block.

In some embodiments, the determination unit 920 is configured to use a default block as the reference block of the current image block when no neighboring block that meets the preset condition is found among the N neighboring blocks.

In some embodiments, the default block is an image block pointed to by a motion vector (0, 0).

In some embodiments, the determination unit 920 is configured to divide the current image block into a plurality of sub-blocks, determine a related block of the sub-block in the reference image of the current image block according to the motion vector of the target neighboring block. The related block of the current image block includes the related block of the sub-block.

In some embodiments, the size of the sub-block and/or the size of the related block of the sub-block is fixed to be greater than or equal to 64 pixels.

In some embodiments, the current image block is a coding unit (CU).

In some embodiments, the determination unit 920 is configured to determine a related block of the current image block in the reference image of the current image block according to the motion vector of the target neighboring block.

In some embodiments, the neighboring block is an image block adjacent to or having a certain distance to the current image block on the current image.

In some embodiments, the encoding/decoding unit 930 is configured to, when the reference image of the related block is the specific reference image, or when the reference image of the current image block is the specific reference image, determine the reference block of the current image block according to the processed motion vector of the related block and the reference image of the current image block.

The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

In some embodiments, the encoding/decoding unit 930 is configured to, when the reference image of the related block is the specific reference image, or when the reference image of the current block is the specific reference image, determine the reference block of the current image block without referencing to the motion vector of the related block.

In some embodiments, the determination unit 920 is configured to, when the motion vector of the specific neighboring block points to the specific reference image or when the reference image of the current image block is the specific reference image, determine the reference block of the current image block according to the processed motion vector of the related block and the reference image of the current image block. The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

The obtaining unit 910, the determination unit 920, and the encoding/decoding unit 930 in the embodiments may be implemented by one or more processors.

Figure 10:
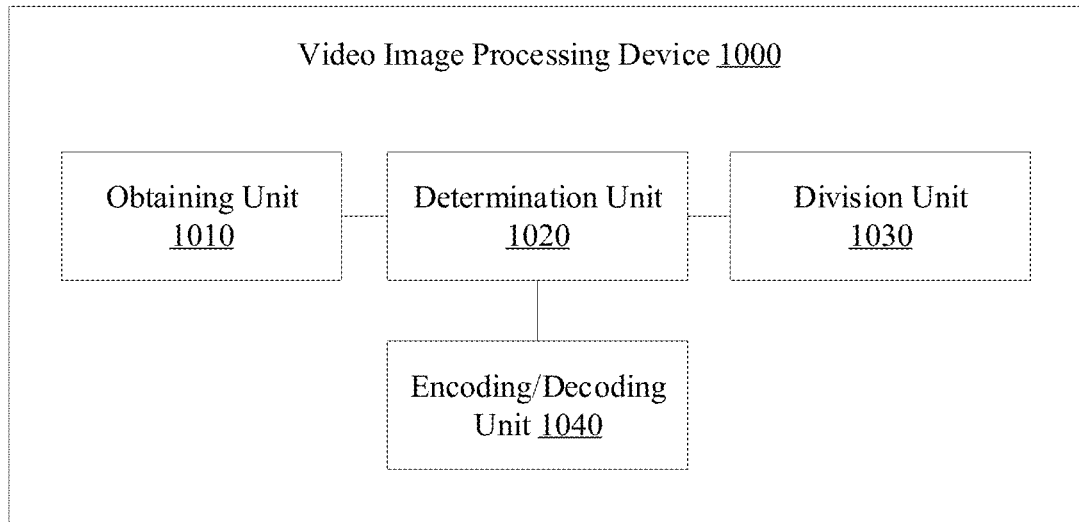
FIG. 10 is another schematic block diagram of a video image processing device according to an embodiment of the disclosure.

FIG. 10 schematically shows a device 1000 for processing video images according to another embodiment of the present disclosure. The device 1000 can be used to execute, e.g., the method embodiment shown in FIG. 8. The device 1000 includes an obtaining unit 1010 configured to obtain M neighboring blocks of a current image block, a determination unit 1020 configured to sequentially scan at least some of the neighboring blocks among the M neighboring blocks and determine a target neighboring block according to a scan result, a division unit 1030 configured to divide the current image block into multiple sub-blocks, where a size of the sub-block is fixed to be greater than or equal to 64 pixels, and an encoding/decoding unit 1040 configured to encode/decode the current image block according to a motion vector of a related block of the current image block, which is determined in a reference image of the current image block by the determination unit 1020 according to the motion vector of the target neighboring block and sub-block.

In some embodiments, the size of the sub-block of the current image block is fixed to be greater than or equal to 64 pixels. There is no need to store information about the size of the sub-block of the last encoded image block, therefore, the storage space can be saved.

In some embodiments, the size of the sub-block and/or the size of the time-domain reference block of the sub-block are both fixed at 8×8 pixels.

At present, in a new generation of the versatile video coding standard (VVC), the motion vector is stored with a size of 8×8. In the embodiments of the present disclosure, the size of the sub-block of the current image block can be set to 8×8 to adapt to the storage granularity of the motion vector specified in the video standard VVC on the one hand, and on the other hand, there is no need to store the information of the size of the sub-block of the last encoded image block, therefore, the storage space is saved.

On the premise that the size of the sub-block and/or the related block of the sub-block is fixed to be equal to 64 pixels, the size of the sub-block and/or the related block of the sub-block may also be other dimensions, for example, the size of the sub-block and/or the size of the related block of the sub-block is A×B, where A≤64, B≤64, and A and B are both multiples of 4. For example, the size of the sub-block and/or the size of the related block of the sub-block is 4×16 pixels, or 16×4 pixels.

In some embodiments, sequentially scanning the at least some of the neighboring blocks among the M neighboring blocks and determining the target neighboring block according to the scan result includes sequentially scanning the at least some of the neighboring blocks, when a first neighboring block that meets a preset condition is scanned, stopping the scanning, and determining the target neighboring block according to the first scanned neighboring block that meets the preset condition.

In some embodiments, the determination unit 1020 is configured to use the first neighboring block that meets the preset condition as a target neighboring block.

In some embodiments, the preset condition includes that a reference image of the neighboring block is the same as the reference image of the current image block.

In some embodiments, the determination unit 1020 is configured to determine a related block of the sub-block in the reference image of the current image block according to the motion vector of the target neighboring block and the sub-block. The related block of the current image block includes the related block of the sub-block.

The obtaining unit 1010, the determination unit 1020, the division unit 1030, and the encoding/decoding unit 1040 in the embodiments may be implemented by one or more processors.

Figure 11:
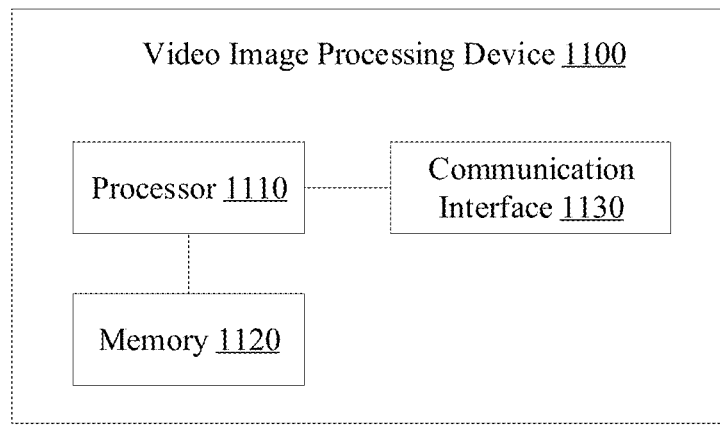
FIG. 11 is another schematic block diagram of a video image processing device according to an embodiment of the disclosure.

FIG. 11 schematically shows a device 1100 for processing video images according to another embodiment of the present disclosure. The device 1100 may be used to execute the method embodiments described above. The device 1100 includes a processor 1110 and a memory 1120. The memory 1120 is used to store instructions. The processor 1110 is configured to execute the instructions stored in the memory 1120 to perform a method consistent with the disclosure, such as one of the above-described example methods.

In some embodiments, as shown in FIG. 11, the device 1100 further includes a communication interface 1130 for communicating with external devices. For example, the processor 1110 is configured to control the communication interface 1130 to receive and/or send signals.

The devices 500, 600, 900, 1000, and 1100 provided in this disclosure may be applied to an encoder or a decoder.

The second motion vector candidate list is explained above, and the first motion vector candidate list will be explained below.

In the motion compensation prediction stage, only a translational motion model is applied in the mainstream video coding standards. In the real applications, there are too many forms of motion, such as zoom in/out, rotation, distant motion and other irregular motions. In order to improve the efficiency of inter prediction, an affine transformation motion compensation model can be introduced into the encoding and decoding technology. The affine transformation motion compensation describes an affine motion field of an image block through MVs of a set of control points. For example, the affine transformation motion compensation model adopts a four-parameter affine model, and the group of control points includes two control points (for example, the upper left corner point and the upper right corner point of the image block). As another example, the affine transformation motion compensation model adopts a six-parameter affine model, and the group of control points includes three control points (for example, the upper left corner point, the upper right corner point, and the lower left corner point of the image block).

In an implementation manner, when the first motion vector candidate list is constructed, the added candidates may be MVs of a group of control points, which may be called control point motion vector prediction (CPMVP). In some embodiments, the first motion vector candidate list may be used in the Merge mode, which may be called an Affine Merge mode. Correspondingly, the first motion vector candidate list may be called an affine merge candidate list. In the Affine Merge mode, the prediction in the first motion vector candidate list is directly used as the control point motion vector (CPMV) of the current image block, that is, no affine motion prediction process is required.

In another implementation manner, a candidate determined according to the ATMVP technology may be added to the first motion vector candidate list.

For example, the control point motion vector group of the related block of the current image block is added as a candidate to the first motion vector candidate list. When the candidate in the first motion vector list is used for prediction, the control point motion vector group of the related block of the current image block is used for prediction on the current image block.

For example, as described above, the representative motion vector of the related block of the current image block is added as a candidate to the first motion vector candidate list. Further, the candidate may be also identified as being determined according to the ATMVP technology. When the candidate in the first motion vector candidate list is used for prediction, the related block of the current image block is determined according to the identifier and the candidate, and the current image block and the related block are divided into multiple sub-blocks in the same way. Sub-blocks in the current image block correspond to sub-blocks in the related block in a one-to-one correspondence. Various sub-blocks in the current image block are respectively predicted according to the motion vectors of various corresponding sub-blocks in the related block.

In some embodiments, when a sub-block with an unavailable motion vector exists in the related block, the representative motion vector of the related block is used to replace the unavailable motion vector to predict the corresponding sub-block in the current image block. In some embodiments, when no representative motion vector of the related block is available, the candidate determined according to the ATMVP technology is not added to the second motion vector candidate list. For example, when the sub-block in the related block is not available, or the sub-block in the related block uses the intra-coding mode, it is determined that there exists a sub-block with an unavailable motion vector in the related block.

In some embodiments, each candidate in the first motion vector candidate list includes motion vectors of a set of control points. When the representative motion vector of the related block of the current image block is added to the first motion vector candidate list, in order to guarantee the consistency of the data format, the representative motion vector of the related block can be inserted as the motion vector of each control point in the candidate (that is, the representative motion vector of the related block is assigned to the motion vector of each control point in the candidate).

In some embodiments, the representative motion vector of the related block of the current image block may refer to a motion vector at a center position of the related block, or another motion vector representing the related block, which is not limited here.

According to the above description of the second motion vector candidate list, when the candidate is determined according to the ATMVP technology, the related block of the current image block needs to be determined. In this disclosure, when the candidates to be added to the first motion vector candidate list are determined according to the ATMVP technology, there are two methods for determining the related block of the current image block.

In the first method, N neighboring blocks among the preset M neighboring blocks of the current image block are scanned sequentially, and a target neighboring block is determined according to a scan result, where N is smaller than M and M is smaller than or equal to 4. A related block of the current image block is determined according to the motion vector of the target neighboring block, the current image block and the reference image of the current image block.

In the second method, the M neighboring blocks of the current image block are determined according to the M candidates in the second motion vector candidate list of the current image block. The N neighboring blocks among the M neighboring blocks are scanned sequentially, and a target neighboring block is determined according to a scan result, where N is smaller than M and M is smaller than or equal to 4. A related block of the current image block is determined according to the motion vector of the target neighboring block, the current image block and the reference image of the current image block. The M candidates in the second motion vector candidate list may refer to the M neighboring blocks of the current image block.

For the description of two processes of "a target neighboring block is determined according to a scan result" and "a related block of the current image block is determined according to the motion vector of the target neighboring block, the current image block and the reference image of the current image block" in the first method and the second method, a reference can be made to the above explanation, which is not repeated here.

In an implementation manner, the method for determining the candidates to be added to the first motion vector candidate list includes determining the control point motion vector group of the neighboring blocks predicted by the affine transformation mode from neighboring blocks of the current image block in a specific scanning order, and adding each determined control point motion vector group of the neighboring block as a candidate to the first motion vector candidate list.

For example, the neighboring block predicted by the affine transformation mode means that the motion vector of the neighboring block is determined according to the candidates in the affine merge candidate list. That is, this is an affine motion model in which the candidate comes from the spatial neighboring block of the current image block that uses the affine mode. That is, the CPMV of the spatial neighboring block using the affine mode is used as the CPMVP of the current block.

For example, the control point motion vector group may include the motion vectors of the two control points of the neighboring block (for example, the upper left corner point and the upper right corner point of the neighboring block), or the motion vectors of the three control points of the neighboring block (such as the upper left corner point, the upper right corner point, and the lower left corner points of the image block), which depends on whether the four-parameter affine model or the six-parameter affine model is used.

For example, determining the control point motion vector group of the neighboring block predicted by the affine transformation mode according to a specific scanning order includes determining a control point motion vector group of a first neighboring block in the left neighboring block of the current image block according to a first scanning order, determining a control point motion vector group of a second neighboring block in the upper neighboring block of the current image block according to a second scanning order, and adding the control point motion vector group of the first neighboring block and the control point motion vector group of the second neighboring block to the first motion vector candidate list.

Figure 12:
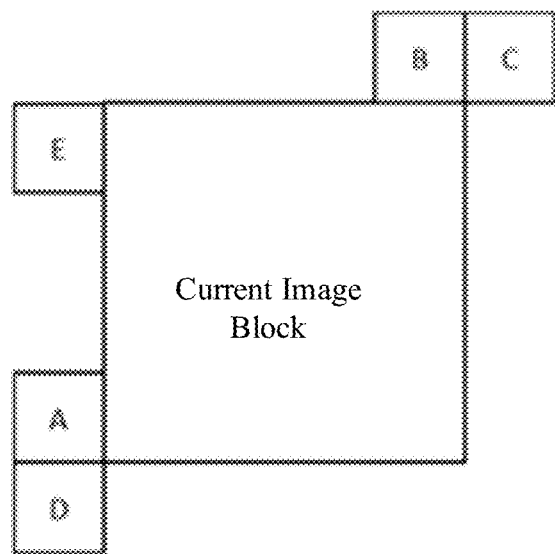
FIG. 12 is a schematic diagram showing obtaining a candidate motion vector for a first candidate list.

FIG. 12 is a schematic diagram showing obtaining candidates for the first motion vector candidate list through neighboring blocks of the current image block. A first control point motion vector group of the image block that meets a preset condition is added as a candidate to the first motion vector candidate list when a scanning is performed on the left side of the current image block according to an order of image block A→image block D→image block E. A first control point motion vector group of the image block that meets a preset condition is added as a candidate to the first motion vector candidate list when a scanning is performed in the upper side of the current image block according to an order of image block B→image block C. In some embodiments, according to the scanning orders, if an image block meeting the threshold condition is not found, then candidates are not determined according to the scanning orders.

In an implementation manner, the method for determining candidates to be added to the first motion vector candidate list includes constructing motion vectors of some of the control points according to the neighboring blocks of some of control points of the current image block, and adding the motion vectors of some of the control points of the current image block to the first motion vector candidate list.

That is, in this implementation manner, candidates are added to the first motion vector candidate list by constructing candidates. For example, before candidates are added to the first motion vector candidate list by constructing candidates, it is first determined whether a number of candidates in the first motion vector candidate list has reached a preset value (for example, 5). If the preset value is not reached, the candidates are added to the first motion vector candidate list by constructing candidates.

For example, the constructed candidate combines motion information of the neighboring blocks of some of the control points of the current image block and is added as the CPMVP to the first motion vector candidate list.

Figure 13:
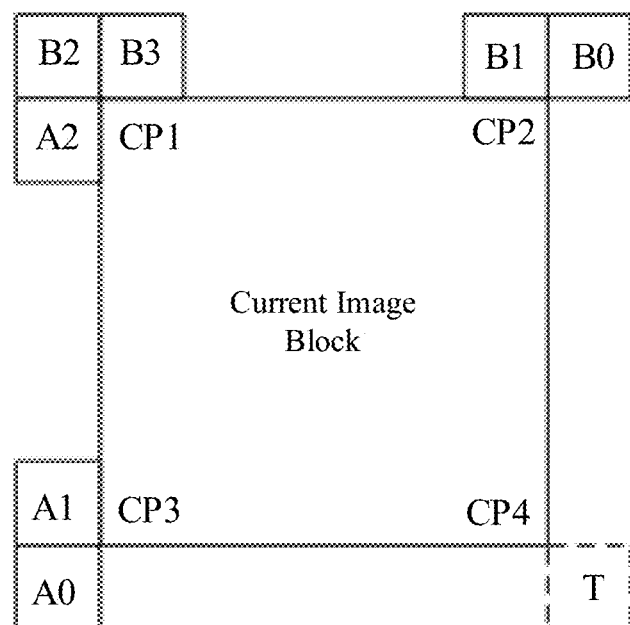
FIG. 13 is another schematic diagram showing constructing a candidate motion vector for a first candidate list.

FIG. 13 is a schematic diagram showing constructing candidates for the first motion vector candidate list through neighboring blocks of the current image block. There are four control points in the current image block, namely CP1, CP2, CP3, and CP4. The image blocks A0 and A1 are the spatial neighboring blocks of CP1, the image blocks A2, B2 and B3 are the spatial neighboring blocks of CP2, the image blocks B0 and B1 are the spatial neighboring blocks of CP2, and T is the time-domain neighboring block of CP4. The coordinates of the control points CP1, CP2, CP3 and CP4 are respectively: (0, 0), (W, 0), (H, 0) and (W, H). W and H represent the width and height of the current CU, respectively. The priority of obtaining motion information of neighboring blocks of each control point is as follows.

For CP1, the obtaining priority is B2→B3→A2. When B2 is available, the MV of B2 is used as the MV of the control point CP1. When B2 is not available, the MV of B3 is used as the MV of the control point CP1. When B2 and B3 are not available, the MV of A2 is used as the MV of the control point CP1. If B2, B3 and A2 are not available, the motion information of the control point CP1 is not available.

Similarly, for CP2, the obtaining priority is B1→B0. For CP3, the obtaining priority is A1→A0. For CP4, the MV of T is directly used as the MV of the control point CP4.

Only when all the MVs of the control points of the current CU (six-parameter model: CP0, CP1 and CP2; four-parameter model: CP0 and CP1) are available, the constructed MV is inserted, otherwise the process is skipped to the next process. After all the MVs of control points (if any) are obtained, multiple affiliate candidates can be obtained by combining the MVs of the control points in different manners. The combination method is as follows.

If the four-parameter affine model is used, one or more candidates can be obtained by combining two of the MVs of the four control points. Two of the combination methods are as follows: {CP1, CP2} and {CP1, CP3}. For the combination method {CP1, CP3}, the MVs of the selected two control points need to be converted into the MVs of the upper left and upper right control points of the current CU (CP1 and CP2) according to the four-parameter model.

If the six-parameter affine model is used, one or more candidates can be obtained by combining three of the MVs of the four control points. Four of the combination methods are as follows: {CP1, CP2, CP4}, {CP1, CP2, CP3}, {CP2, CP3, CP4}, and {CP1, CP3, CP4}. For the combination methods {CP1, CP2, CP3}, {CP2, CP3, CP4}, {CP1, CP3, CP4}, the MVs of the selected three control points need to be converted into the MVs of the upper left, upper right, and lower left control points of the current CU (CP1, CP2 and CP3) according to the six-parameter model.

For example, if the reference frames used by different combinations of MVs (2 or 3) are not the same, the candidate constructed by the combination is considered as not available.

In an implementation manner, the method for determining candidates to be added to the first motion vector candidate list includes using a default vector for filling. In some embodiments, the default vector can be a zero vector or another vector. In some embodiments, after the candidates to be added to the first motion vector candidate list are determined according to other methods, it is determined whether the number of candidates that have been added to the first motion vector candidate list has reached a preset value. If the preset value is not reached, the default vector is filled into the first candidate list until the number of candidates in the first candidate list reaches the preset value.

When the candidate in the first motion vector candidate list is used to predict the current image block, if the candidate used is at least one candidate other than the candidates determined by the ATMVP technology, the motion vector of the sub-block in the current image block is derived according to the candidate through the affine motion model. When the candidate used is a candidate determined by ATMVP technology, according to the above description, the reference block of each sub-block in the current image block is determined according to the motion vector of each sub-block in the related block, the reference blocks of each sub-block are combined into a reference block of the current image block, and the residual of the current image block is calculated according to the reference block.

Figure 14:
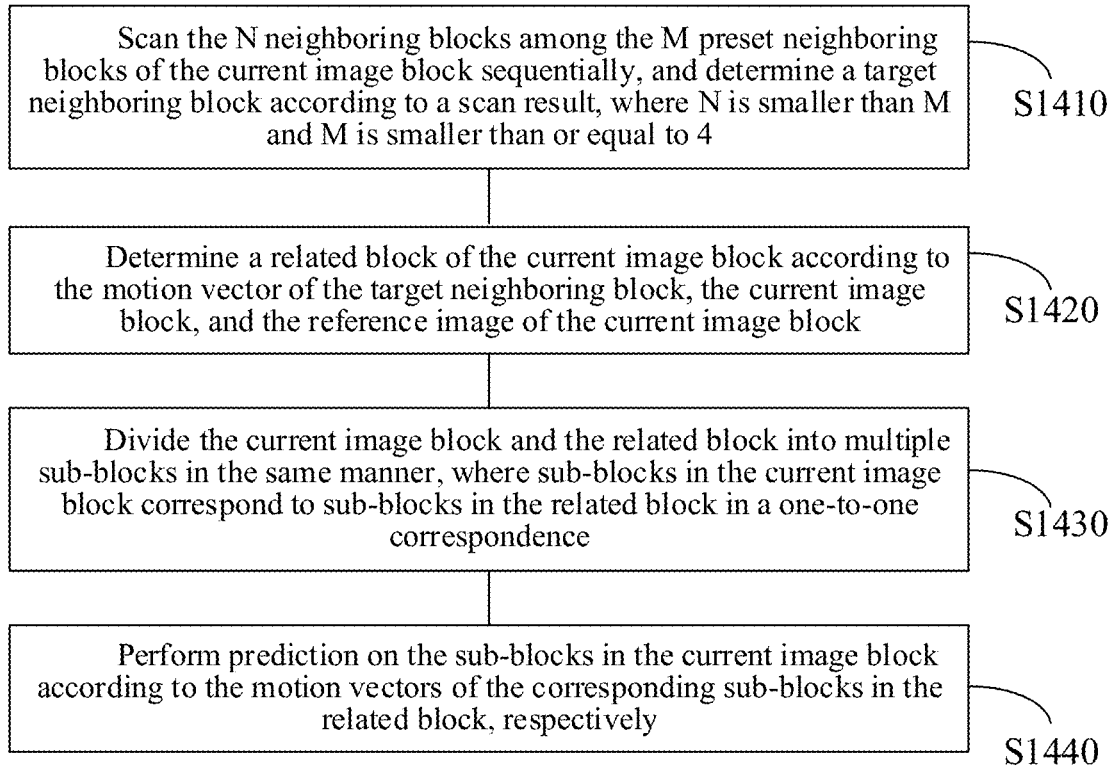
FIGS. 14 and 15 are schematic flowcharts of a video image processing method according to an embodiment of the disclosure.

Hereinafter, a video image processing method according to an embodiment of the present disclosure is described with reference to FIGS. 14 and 15. As shown in FIG. 14, at S1410, the N neighboring blocks among the M preset neighboring blocks of the current image block are scanned sequentially, and a target neighboring block is determined according to a scan result, where N is smaller than M. In some embodiments, M is smaller than or equal to 4.

At S1420, a related block of the current image block is determined according to the motion vector of the target neighboring block, the current image block, and the reference image of the current image block.

At S1430, the current image block and the related block are divided into a plurality of sub-blocks in the same manner, and sub-blocks in the current image block correspond to sub-blocks in the related block in a one-to-one correspondence.

At S1440, prediction is performed on the sub-blocks in the current image block according to the motion vectors of the corresponding sub-blocks in the related block, respectively.

For the explanation of the video image processing method shown in FIG. 14, reference can be made to the above description, which is not repeated here.

Figure 15:
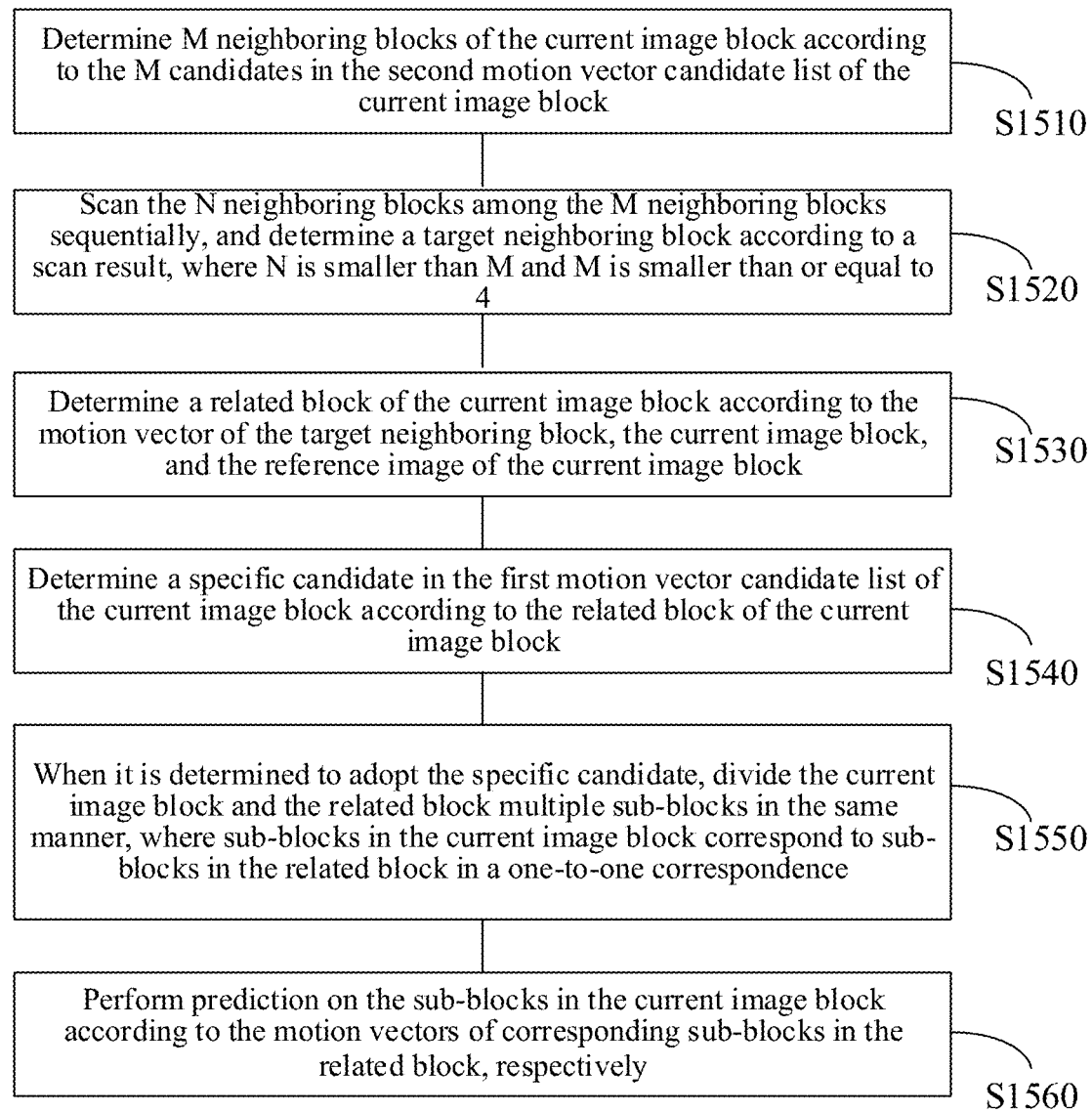

As shown in FIG. 15, at S1510, M neighboring blocks of the current image block are determined according to the M candidates in the second motion vector candidate list of the current image block.

At S1520, the N neighboring blocks among the M neighboring blocks are scanned sequentially, and a target neighboring block is determined according to a scan result, where N is smaller than M. In some embodiments, M is smaller than or equal to 4.

At S1530, a related block of the current image block is determined according to the motion vector of the target neighboring block, the current image block, and the reference image of the current image block.

At S1540, a specific candidate in the first motion vector candidate list of the current image block is determined according to the related block of the current image block. The specific candidate may be the candidate determined according to the ATMVP technology described above.

At S1550, when it is determined to adopt the specific candidate, the current image block and the related block are divided into a plurality of sub-blocks in the same manner, and sub-blocks in the current image block correspond to sub-blocks in the related block in a one-to-one correspondence.

At S1560, prediction is performed on the sub-blocks in the current image block according to the motion vectors of corresponding sub-blocks in the related block, respectively.

For the explanation of the video image processing method shown in FIG. 15, reference can be made to the above description, which is not repeated here.

Figure 16:
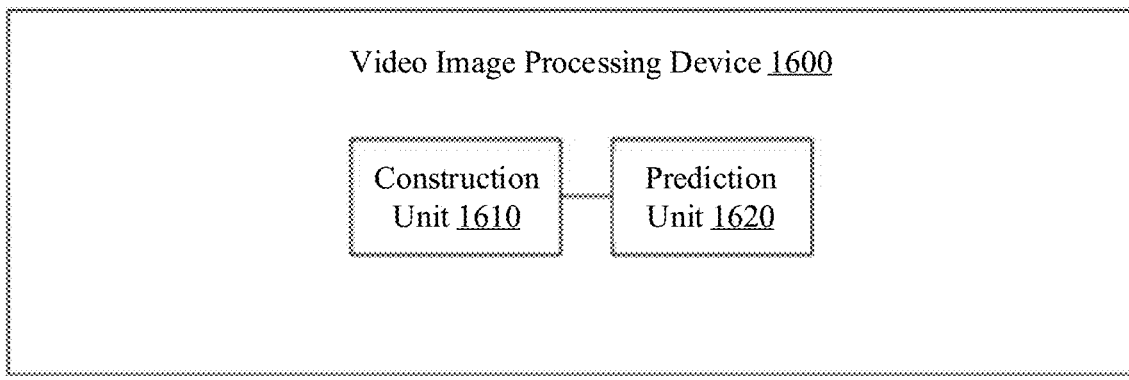
FIG. 16 is another schematic block diagram of a video image processing device according to an embodiment of the disclosure.

FIG. 16 is a schematic block diagram of a video image processing device 1600 according to an embodiment of the disclosure. The device 1600 can be used to execute, e.g., the method embodiment shown in FIG. 14. The device 1600 includes the following units.

A construction unit 1610 is configured to scan the N neighboring blocks among the M preset neighboring blocks of the current image block sequentially and determine a target neighboring block according to a scan result, where N is smaller than M, determine a related block of the current image block according to the motion vector of the target neighboring block, the current image block, and the reference image of the current image block, and divide the current image block and the related block into a plurality of sub-blocks in the same manner, where sub-blocks in the current image block correspond to sub-blocks in the related block in a one-to-one correspondence.

A prediction unit 1620 is configured to perform prediction on the sub-blocks in the current image block according to the motion vectors of corresponding sub-blocks in the related block, respectively.

In some embodiments, N is equal to 1 or 2.

In some embodiments, the prediction unit is further configured to add the representative motion vector of the related block as a candidate to the first motion vector candidate list before prediction is performed on the sub-blocks in the current image block according to the motion vectors of corresponding sub-blocks in the related block, respectively, and, when it is determined to adopt the candidate, perform prediction on the sub-blocks in the current image block according to the motion vectors of corresponding sub-blocks in the related block, respectively.

In some embodiments, performing prediction on the sub-blocks in the current image block according to the motion vectors of corresponding sub-blocks in the related block, respectively, includes using the motion vectors of the sub-blocks in the related block as the motion vectors of the corresponding sub-blocks in the current image block, respectively.

In some embodiments, the representative motion vector of the related block is added to the first motion vector candidate list as a first candidate.

In some embodiments, the representative motion vector of the related block includes a motion vector at a center position of the related block.

In some embodiments, the prediction unit is further configured to, when a sub-block with an unavailable motion vector exists in the related block, use the representative motion vector of the related block as the motion vector of the sub-block with the unavailable motion vector to predict the corresponding sub-block in the current image block.

In some embodiments, the prediction unit is further configured to, when a sub-block with an unavailable motion vector exists in the related block and no representative motion vector of the related block is available, not perform the prediction of a sub-block in the current image block according to the motion vector of corresponding sub-block in the related block.

In some embodiments, the prediction unit is further configured to, when the sub-block in the related block is not available, or the sub-block in the related block uses the intra-coding mode, determine that there exists a sub-block with an unavailable motion vector in the related block.

In some embodiments, the construction unit is further configured to determine other candidates and add the other candidates to the first motion vector candidate list, wherein at least one candidate among the other candidates includes the motion vector of the sub-block.

In some embodiments, the construction unit is further configured to, when it is determined to adopt the one candidate of the other candidates, determine the motion vector of the sub-block in the current image block according to the adopted candidate.

In some embodiments, the at least one candidate includes motion vectors of a set of control points.

In some embodiments, the prediction unit is further configured to, when it is determined to adopt a candidate among the at least one candidate, perform the affine transformation on the adopted candidate according to the affine transformation model, and perform prediction on the sub-block in the current image block according to the candidate after the affine transformation.

In some embodiments, when the affine transformation model includes a four-parameter affine transformation model, among the at least one candidate, each candidate includes motion vectors of two control points. When the affine transformation model includes a six-parameter affine transformation model, among the at least one candidate, each candidate includes motion vectors of 3 control points.

In some embodiments, the construction unit is further configured to determine the control point motion vector group of the neighboring blocks predicted by the affine transformation mode according to a specific scanning order among the neighboring blocks of the current image block, and add each determined control point motion vector group of the neighboring blocks as a candidate to the first motion vector candidate list.

In some embodiments, determining the control point motion vector group of the neighboring block predicted by the affine transformation mode according to a specific scanning order among the neighboring block of the current image block includes determining a control point motion vector group of a first neighboring block in the left neighboring block of the current image block according to a first scanning order, determining a control point motion vector group of a second neighboring block in the upper neighboring block of the current image block according to a second scanning order, and adding the control point motion vector group of the first neighboring block and the control point motion vector group of the second neighboring block to the first motion vector candidate list.

In some embodiments, the construction unit is further configured to construct motion vectors of some of the control points according to the neighboring blocks of some of control points of the current image block, and add the motion vectors of some of the control points of the current image block to the first motion vector candidate list.

In some embodiments, constructing motion vectors of some of the control points according to the neighboring blocks of some of control points of the current image block includes, for each control point of the some of the control points, scanning the specific neighboring blocks of the control point sequentially in a third scanning order, and using the motion vector of the specific neighboring block that meets a preset condition as the motion vector of the control point.

In some embodiments, the construction unit is further configured to, when the motion vectors of the some of the control points respectively point to different reference frames, not add the motion vectors of the some of the control points of the current image block to the first motion vector candidate list.

In some embodiments, when a number of candidates in the first motion vector candidate list is greater than a preset value, the motion vectors of the some of the control points of the current image block are not added to the first motion vector candidate list.

In some embodiments, the construction unit is further configured to construct a second motion vector candidate list, where the candidate added to the second motion vector candidate list is a motion vector of an image block, and, when it is confirmed that the candidate in the second motion vector candidate list is adopted, determine the motion vector of the current image block according to the motion vector of the candidate.

In some embodiments, determining the motion vector of the current image block according to the motion vector of the candidate includes using the determined adopted candidate as the motion vector of the current image block, or scaling the determined adopted candidate to be used as the motion vector of the current image block.

In some embodiments, constructing the second motion vector candidate list includes determining the candidate to be added to the second motion vector candidate list according to the motion vectors of multiple neighboring blocks of the current image block on the current image.

In some embodiments, the multiple neighboring blocks of the current image block on the current image include the preset M neighboring blocks.

In some embodiments, construction unit is further configured to sequentially use the motion vectors of the preset M neighboring blocks as M candidates according to a preset order, and add them to the second motion vector candidate list. The N neighboring blocks refer to N neighboring blocks first determined according to the preset order.

In some embodiments, construction unit is further configured to, when the motion vector of one or more neighboring blocks in the M neighboring blocks is unavailable, not determine a candidate to be added to the second motion vector candidate list according to the motion vector of the one or more neighboring blocks.

In some embodiments, scanning the N neighboring blocks among the M neighboring blocks sequentially and determining the target neighboring block according to a scan result includes scanning the N neighboring blocks sequentially, when a first neighboring block that meets the preset condition is found, stopping the scanning, and determining the target neighboring block according to the first scanned neighboring block that meets the preset condition.

In some embodiments, determining the target neighboring block according to the first scanned neighboring block that meets the preset condition includes using the first neighboring block that meets the preset condition as the target neighboring block.

In some embodiments, the preset condition includes that the reference image of the neighboring block is the same as the reference image of the current image block.

In some embodiments, the construction unit is further configured to, when no neighboring block that meets the preset condition is found among the N neighboring blocks, scale the motion vector of a specific neighboring block among the M neighboring blocks, and the prediction unit is further configured to predict the current image block according to a scaled motion vector.

In some embodiments, predicting the current image block according to a scaled motion vector includes determining the reference block of the current image block according to the scaled motion vector and the reference image of the current image block.

In some embodiments, the specific neighboring block is the first neighboring block, or the last neighboring block obtained according to a scanning order among the N neighboring blocks.

In some embodiments, scaling the motion vector of the specific neighboring block among the M neighboring blocks and predicting the current image block according to the scaled motion vector includes scaling the motion vector of the specific neighboring block to make the reference frame pointed to by the scaled motion vector the same as the reference image of the current image block, and using the image block pointed to by the scaled motion vector in the reference image of the current image block as the reference block of the current image block.

In some embodiments, when no neighboring block meeting the preset condition is found among the N neighboring blocks, a default block is used as the reference block of the current image block.

In some embodiments, the default block is an image block pointed to by a motion vector (0, 0).

In some embodiments, the size of the sub-block and/or the size of the related block of the sub-block is fixed to be greater than or equal to 64 pixels.

In some embodiments, the size of the sub-block and/or the size of the related block of the sub-block are both fixed at 8×8 pixels, or 16×4 pixels, or 4×16 pixels.

In some embodiments, the current image block is a CU.

In some embodiments, determining the related block of the current image block according to the motion vector of the target neighboring block, the current image block, and the reference image of the current image block includes determining the related block of the current image block in the reference image of the current image block according to the motion vector of the target neighboring block.

In some embodiments, the neighboring block is an image block adjacent to or having a certain distance to the current image block on the current image.

In some embodiments, predicting the current image block according to the motion vector of the related block includes, when the reference image of the related block is the specific reference image, or when the reference image of the current image block is the specific reference image, determining the reference block of the current image block according to the processed motion vector of the related block and the reference image of the current image block.

The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

In some embodiments, predicting the current image block according to the motion vector of the related block includes, when the reference image of the related block is the specific reference image, or when the reference image of the current block is the specific reference image, determining the reference block of the current image block without referencing to the motion vector of the related block.

In some embodiments, the construction unit is further configured to, when the motion vector of the specific neighboring block points to the specific reference image or when the reference image of the current image block is the specific reference image, determine the reference block of the current image block according to the processed motion vector of the related block and the reference image of the current image block.

The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

In some embodiments, M is smaller than or equal to 4.

Figure 17:
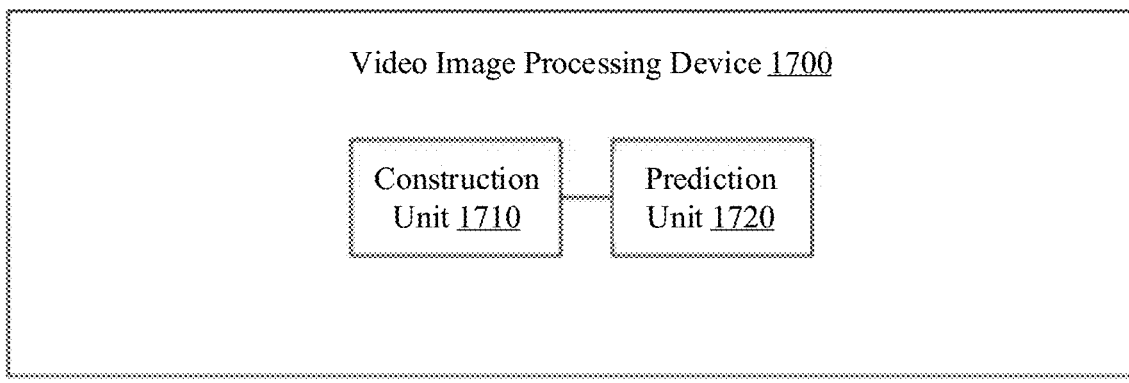
FIG. 17 is another schematic block diagram of a video image processing device according to an embodiment of the disclosure.

FIG. 17 is a schematic block diagram of a video image processing device 1700 according to an embodiment of the disclosure. The device 1700 can be used to execute, e.g., the method embodiment shown in FIG. 15. The device 1700 includes the following units.

A construction unit 1710 is configured to determine M neighboring blocks of the current image block according to the M candidates in the second motion vector candidate list of the current image block, scan the N neighboring blocks among the M neighboring blocks sequentially and determine a target neighboring block according to a scan result, where N is smaller than M, determine a related block of the current image block according to the motion vector of the target neighboring block, the current image block, and the reference image of the current image block, determine a specific candidate in the first motion vector candidate list of the current image block according to the related block of the current image block, and divide the current image block and the related block into a plurality of sub-blocks in the same manner when it is determined to adopt the specific candidate, where sub-blocks in the current image block correspond to sub-blocks in the related block in a one-to-one correspondence.

A prediction unit 1720 is configured to perform prediction on the sub-blocks in the current image block according to the motion vectors of corresponding sub-blocks in the related block, respectively.

In some embodiments, at least one candidate in the first motion vector candidate list includes a motion vector of a sub-block, and each candidate in the second motion vector candidate list includes a motion vector of an image block.

In some embodiments, N is equal to 1 or 2.

In some embodiments, the M candidates include motion vectors of M neighboring blocks of the current image block on the current image.

In some embodiments, scanning the N neighboring blocks among the M neighboring blocks sequentially and determining the target neighboring block according to a scan result includes scanning the N neighboring blocks sequentially, when a first neighboring block that meets the preset condition is found, stopping the scanning, and determining the target neighboring block according to the first scanned neighboring block that meets the preset condition.

In some embodiments, determining the target neighboring block according to the first scanned neighboring block that meets the preset condition includes using the first neighboring block that meets the preset condition as the target neighboring block.

In some embodiments, the preset condition includes that the reference image of the neighboring block is the same as the reference image of the current image block.

In some embodiments, the construction unit is further configured to, when no neighboring block that meets the preset condition is found among the N neighboring blocks, scale the motion vector of a specific neighboring block among the M neighboring blocks, and the prediction unit is further configured to predict the current image block according to a scaled motion vector.

In some embodiments, predicting the current image block according to a scaled motion vector includes determining the reference block of the current image block according to the scaled motion vector and the reference image of the current image block.

In some embodiments, the specific neighboring block is the first neighboring block, or the last neighboring block obtained according to a scanning order among the N neighboring blocks.

In some embodiments, scaling the motion vector of the specific neighboring block among the M neighboring blocks and predicting the current image block according to the scaled motion vector includes scaling the motion vector of the specific neighboring block to make the reference frame pointed to by the scaled motion vector the same as the reference image of the current image block, and using the image block pointed to by the scaled motion vector in the reference image of the current image block as the reference block of the current image block.

In some embodiments, when no neighboring block meeting the preset condition is found among the N neighboring blocks, a default block is used as the reference block of the current image block.

In some embodiments, the default block is an image block pointed to by a motion vector (0, 0).

In some embodiments, the size of the sub-block and/or the size of the related block of the sub-block is fixed to be greater than or equal to 64 pixels.

In some embodiments, the size of the sub-block and/or the size of the related block of the sub-block are both fixed at 8×8 pixels, or 16×4 pixels, or 4×16 pixels.

In some embodiments, the current image block is a CU.

In some embodiments, determining the related block of the current image block according to the motion vector of the target neighboring block, the current image block, and the reference image of the current image block includes determining the related block of the current image block in the reference image of the current image block according to the motion vector of the target neighboring block.

In some embodiments, the neighboring block is an image block adjacent to or having a certain distance to the current image block on the current image.

In some embodiments, predicting the current image block according to the motion vector of the related block includes, when the reference image of the related block is the specific reference image, or when the reference image of the current image block is the specific reference image, determining the reference block of the current image block according to the processed motion vector of the related block and the reference image of the current image block.

The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

In some embodiments, predicting the current image block according to the motion vector of the related block includes, when the reference image of the related block is the specific reference image, or when the reference image of the current block is the specific reference image, determining the reference block of the current image block without referencing to the motion vector of the related block.

In some embodiments, the construction unit is further configured to, when the motion vector of the specific neighboring block points to the specific reference image or when the reference image of the current image block is the specific reference image, determine the reference block of the current image block according to the processed motion vector of the related block and the reference image of the current image block.

The processed motion vector of the related block is the same as the motion vector of the related block before processing.

In some embodiments, the processed motion vector of the related block includes a motion vector obtained by scaling the motion vector of the related block according to a scaling factor of 1, or a motion vector of the related block skipping the scaling process.

In some embodiments, performing prediction on the sub-blocks in the current image block according to the motion vectors of corresponding sub-blocks in the related block, respectively, includes using the motion vectors of sub-blocks in the related block as the motion vectors of the corresponding sub-blocks in the current image block, respectively.

In some embodiments, determining the specific candidate in the first motion vector candidate list of the current image block according to the related block of the current image block includes adding a representative motion vector of the related block of the current image block to the first motion vector candidate list as the specific candidate.

In some embodiments, the representative motion vector of the related block is added to the first motion vector candidate list as a first candidate.

In some embodiments, the representative motion vector of the related block includes a motion vector at a center position of the related block.

In some embodiments, the prediction unit is further configured to, when a sub-block with an unavailable motion vector exists in the related block, use the representative motion vector of the related block as the motion vector of the sub-block with the unavailable motion vector to predict the corresponding sub-block in the current image block.

In some embodiments, the prediction unit is further configured to, when a sub-block with an unavailable motion vector exists in the related block and no representative motion vectors of the related block is available, not perform the prediction of a sub-block in the current image block according to the motion vector of a corresponding sub-block in the related block.

In some embodiments, the prediction unit is further configured to, when the sub-block in the related block is not available, or the sub-block in the related block uses the intra-coding mode, determine that there exists a sub-block with an unavailable motion vector in the related block.

In some embodiments, the prediction unit is further configured to, when it is determined to adopt one of the candidates in the second motion vector candidate list other than the specific candidate, perform affine transformation on the adopted candidate according to the affine transformation model, and perform prediction on the sub-block in the current image block according to the candidate after the affine transformation.

In some embodiments, among the at least one candidate in the second motion vector candidate list other than the specific candidate, each candidate includes motion vectors of a set of control points.

In some embodiments, when the affine transformation model includes a four-parameter affine transformation model, among the at least one candidate, each candidate includes motion vectors of two control points. When the affine transformation model includes a six-parameter affine transformation model, among the at least one candidate, each candidate includes motion vectors of 3 control points.

In some embodiments, the construction unit is further configured to determine the control point motion vector group of the neighboring blocks predicted by the affine transformation mode according to a specific scanning order among the neighboring blocks of the current image block, and add each determined control point motion vector group of the neighboring blocks as a candidate to the first motion vector candidate list.

In some embodiments, determining the control point motion vector group of the neighboring block predicted by the affine transformation mode according to a specific scanning order among the neighboring block of the current image block includes determining a control point motion vector group of a first neighboring block in the left neighboring block of the current image block according to a first scanning order, determining a control point motion vector group of a second neighboring block in the upper neighboring block of the current image block according to a second scanning order, and adding the control point motion vector group of the first neighboring block and the control point motion vector group of the second neighboring block to the first motion vector candidate list.

In some embodiments, the construction unit is further configured to construct motion vectors of some of the control points according to the neighboring blocks of some of control points of the current image block, and add the motion vectors of some of the control points of the current image block to the first motion vector candidate list.

In some embodiments, constructing motion vectors of some of the control points according to the neighboring blocks of some of control points of the current image block includes, for each control point of the some of the control points, scanning the specific neighboring blocks of the control point sequentially in a third scanning order, and using the motion vector of the specific neighboring block that meets a preset condition as the motion vector of the control point.

In some embodiments, the construction unit is further configured to, when the motion vectors of the some of the control points respectively point to different reference frames, not add the motion vectors of the some of the control points of the current image block to the first motion vector candidate list.

In some embodiments, when a number of candidates in the first motion vector candidate list is greater than a preset value, the motion vectors of the some of the control points of the current image block are not added to the first motion vector candidate list.

In some embodiments, the construction unit is further configured to construct a second motion vector candidate list, where the candidate added to the second motion vector candidate list is a motion vector of an image block, and, when it is confirmed that the candidate in the second motion vector candidate list is adopted, determine the motion vector of the current image block according to the motion vector of the candidate.

In some embodiments, determining the motion vector of the current image block according to the motion vector of the candidate includes using the determined adopted candidate as the motion vector of the current image block, or scaling the determined adopted candidate to be used as the motion vector of the current image block.

In some embodiments, constructing the second motion vector candidate list includes determining the M candidates to be added to the second motion vector candidate list according to the motion vectors of M neighboring blocks of the current image block on the current image.

In some embodiments, construction unit is further configured to sequentially use the motion vectors of the preset M neighboring blocks as M candidates according to a preset order, and add them to the second motion vector candidate list. The N neighboring blocks refer to N neighboring blocks first determined according to the preset order.

In some embodiments, construction unit is further configured to, when the motion vector of one or more neighboring blocks in the M neighboring blocks is unavailable, not determine a candidate to be added to the second motion vector candidate list according to the motion vector of the one or more neighboring blocks.

In some embodiments, M is smaller than or equal to 4.

A computer-readable storage medium is also provided in the embodiments of the present disclosure to store instructions. When the instructions are run on the computer, the computer executes the methods in the above embodiments.

A computer program product including instructions is further provided in the embodiments of the present disclosure. When the computer runs the computer program product, the computer executes the processes of the above method embodiments.

In the above embodiments, it can be implemented in whole or in part by software, hardware, firmware, or any combination thereof. When implemented using software, it can be implemented in whole or in part in the form of a computer program product. The computer program product includes one or more computer instructions. When computer instructions are loaded and executed on a computer, the processes or functions according to the embodiments of the present disclosure are generated in whole or in part. The computer may be a general-purpose computer, a special-purpose computer, a computer network, or other programmable devices. Computer instructions can be stored in a computer-readable storage medium or transmitted from one computer-readable storage medium to another computer-readable storage medium. For example, the computer instructions can be transmitted from a website, computer, server, or data center via a wired (e.g., coaxial cable, optical fiber, digital subscriber line (DSL)) or wireless (such as infrared, wireless, microwave, etc.) manner to another website, computer, server or data center. The computer-readable storage medium may be any available medium that can be accessed by a computer or a data storage device including one or more available medium integrated servers, data centers, and the like. The usable media can be magnetic media (such as floppy disks, hard disks and magnetic tapes), optical media (such as high-density digital video disks (DVD)), or semiconductor media (such as solid-state disks (SSD)).

Those of ordinary skills in the art may realize that the units and algorithms described in the embodiments of the disclosure can be implemented by electronic hardware, or a combination of computer software and electronic hardware. Whether these functions are executed in hardware or software depends on the specific application of the technical solution and design constraints. Professional technicians can use different methods to implement the described functions for each specific application, but such implementation should not be considered beyond the scope of this disclosure.

In the embodiments provided in this disclosure, the disclosed system, device, and method may be implemented in other ways. For example, the device embodiments described above are only schematic. For example, the division of the units is only a division of logical functions. In actual implementation, there may be other divisions, for example, multiple units or components may be combined or integrated into another system, or some features may be ignored or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may or may not be physical units, that is, they may be located in one place or may be distributed on multiple network units. Some or all of the units may be selected according to actual needs to achieve the purpose of the solution of this embodiment.

In addition, each functional unit in each embodiment of the present disclosure may be integrated into one processing unit, or each unit may exist alone physically, or two or more units are integrated into one unit.

The above is only the specific implementations of this disclosure, but the scope of this disclosure is not limited to this. Any person skilled in the art can easily think of changes or replacements within the technical scope disclosed in this disclosure, which should be covered by the scope of this disclosure. Therefore, the scope of the invention shall be subject to the scope of the claims.

The invention claimed is:

1. A video image processing method comprising:
dividing a coding unit into one or more sub-blocks;
constructing a first motion vector candidate list and a second motion vector candidate list, the first motion vector candidate list including a motion vector of one of the one or more sub-blocks of the coding unit, and the second motion vector candidate list including a motion vector of the coding unit; and
performing prediction for the coding unit according to the first motion vector candidate list and the second motion vector candidate list;
wherein constructing the first motion vector candidate list includes:
scanning a left neighboring block of the coding unit and:
in response to a reference frame pointed to by a motion vector of the left neighboring block being same as a co-located reference image of the coding unit, determining the motion vector of the left neighboring block as a reference motion vector of the coding unit; and
in response to the reference frame pointed to by the motion vector of the left neighboring block being different from the co-located reference image of the coding unit, determining a default value (0, 0) as the reference motion vector of the coding unit;
determining a related reference block of the one of the one or more sub-blocks of the coding unit in the co-located reference image of the coding unit according to the reference motion vector of the coding unit;
in response to a motion vector of the related reference block of the one of the one or more sub-blocks pointing to a short-term reference image:
performing a scaling operation including:
determining a scaling factor of the motion vector of the related reference block of the one of the one or more sub-blocks according to:
a temporal distance between a reference image pointed to by the motion vector of the related reference block of the one of the one or more sub-blocks and the co-located reference image of the coding unit, and
a temporal distance between the co-located reference image of the coding unit and an image containing the coding unit; and scaling the motion vector of the related reference block of the one of the one or more sub-blocks using the scaling factor; and adding the motion vector of the related reference block of the one of the one or more sub-blocks after being scaled into the first motion vector candidate list; and in response to the motion vector of the related reference block of the one of the one or more sub-blocks pointing to a long-term reference image, skipping the scaling operation and adding the motion vector of the related reference block of the one of the one or more sub-blocks without scaling into the first motion vector candidate list.

2. The method of claim 1, wherein constructing the first motion vector candidate list further includes:

determining a control point motion vector group of a neighboring block predicted by an affine transformation mode from neighboring blocks of the coding unit in a specific scanning order; and adding the control point motion vector group as a candidate to the first motion vector candidate list.

3. A video image processing device comprising:

a memory storing computer executable instructions; and a processor configured to execute the instructions to:

divide a coding unit into one or more sub-blocks;

construct a first motion vector candidate list and a second motion vector candidate list, the first motion vector candidate list including a motion vector of one of the one or more sub-blocks of the coding unit, and the second motion vector candidate list including a motion vector of the coding unit; and perform prediction for the coding unit according to the first motion vector candidate list and the second motion vector candidate list;

wherein the processor executes the instructions to construct the first motion vector candidate list by:

scanning a left neighboring block of the coding unit and:

in response to a reference frame pointed to by a motion vector of the left neighboring block being same as a co-located reference image of the coding unit, determining the motion vector of the left neighboring block as a reference motion vector of the coding unit; and in response to the reference frame pointed to by the motion vector of the left neighboring block being different from the co-located reference image of the coding unit, determining a default value (0, 0) as the reference motion vector of the coding unit;

determining a related reference block of the one of the one or more sub-blocks of the coding unit in the co-located reference image of the coding unit according to the reference motion vector of the coding unit;

in response to a motion vector of the related reference block of the one of the one or more sub-blocks pointing to a short-term reference image:

performing a scaling operation including:

determining a scaling factor of the motion vector of the related reference block of the one of the one or more sub-blocks according to:

a temporal distance between a reference image pointed to by the motion vector of the related reference block of the one of the one or more sub-blocks and the co-located reference image of the coding unit, and a temporal distance between the co-located reference image of the coding unit and an image containing the coding unit; and scaling the motion vector of the related reference block of the one of the one or more sub-blocks using the scaling factor; and adding the motion vector of the related reference block of the one of the one or more sub-blocks after being scaled into the first motion vector candidate list; and in response to the motion vector of the related reference block of the one of the one or more sub-blocks pointing to a long-term reference image, skipping the scaling operation and adding the motion vector of the related reference block of the one of the one or more sub-blocks without scaling into the first motion vector candidate list.

4. The device of claim 3, wherein the processor is further configured to execute the instructions to:

determine a control point motion vector group of a neighboring block predicted by an affine transformation mode from neighboring blocks of the coding unit in a specific scanning order; and add the control point motion vector group as a candidate to the first motion vector candidate list.

5. A computer-readable storage medium storing a bitstream obtained by a video image processing method including:

dividing a coding unit into one or more sub-blocks;

constructing a first motion vector candidate list and a second motion vector candidate list, the first motion vector candidate list including a motion vector of one of the one or more sub-blocks of the coding unit, and the second motion vector candidate list including a motion vector of the coding unit; and performing prediction for the coding unit according to the first motion vector candidate list and the second motion vector candidate list;

wherein constructing the first motion vector candidate list includes:

scanning a left neighboring block of the coding unit and:

in response to a reference frame pointed to by a motion vector of the left neighboring block being same as a co-located reference image of the coding unit, determining the motion vector of the left neighboring block as a reference motion vector of the coding unit; and in response to the reference frame pointed to by the motion vector of the left neighboring block being different from the co-located reference image of the coding unit, determining a default value (0,0) as the reference motion vector of the coding unit;

determining a related reference block of the one of the one or more sub-blocks of the coding unit in the co-located reference image of the coding unit according to the reference motion vector of the coding unit;

in response to a motion vector of the related reference block of the one of the one or more sub-blocks pointing to a short-term reference image:

performing a scaling operation including:
: determining a scaling factor of the motion vector of the related reference block of the one of the one or more sub-blocks according to:
: : a temporal distance between a reference image pointed to by the motion vector of the related reference block of the one of the one or more sub-blocks and the co-located reference image of the coding unit, and
: : a temporal distance between the co-located reference image of the coding unit and an image containing the coding unit; and
: scaling the motion vector of the related reference block of the one of the one or more sub-blocks using the scaling factor; and adding the motion vector of the related reference block of the one of the one or more sub-blocks after being scaled into the first motion vector candidate list; and in response to the motion vector of the related reference block of the one of the one or more sub-blocks pointing to a long-term reference image, skipping the scaling operation and adding the motion vector of the related reference block of the one of the one or more sub-blocks without scaling into the first motion vector candidate list.

* * * * *